United States Patent [19]

Pastor et al.

[11] Patent Number: 5,720,533
[45] Date of Patent: Feb. 24, 1998

[54] BRAKE CONTROL SYSTEM

[75] Inventors: Stephen Robert Pastor, Farmington Hills; William Chin-Woei Lin, Troy; Michael Douglas Rizzo, White Lake; Duane Edward Bassett, West Bloomfield; Edward John Bedner, Brighton; Edmund Stanley Browalski, W. Bloomfield; Douglass L. Carson, Walled Lake; Hsien Heng Chen; Yuen-Kwok Chin, both of Troy; Youssef Ahmed Ghoneim, Macomb Township; Hong Xing Hu, Rochester Hills; Vivek Jaikamal, Ann Arbor; Ronald Paul, Detroit; Steven Lee Tracht, Brighton; Michael Paul Turski, Rochester Hills, all of Mich.

[73] Assignee: General Motors Corporation, Detroit, Mich.

[21] Appl. No.: 732,582

[22] Filed: Oct. 15, 1996

[51] Int. Cl.[6] .................................................. B60T 8/58
[52] U.S. Cl. ........................................ 303/147; 303/140
[58] Field of Search ............................... 303/140, 146, 303/147, 148; 180/197; 364/426.016, 426.028, 424.051

[56] References Cited

U.S. PATENT DOCUMENTS

| | | | |
|---|---|---|---|
| 5,063,514 | 11/1991 | Headley et al. | 303/147 |
| 5,172,961 | 12/1992 | Inoue et al. | 303/100 |

(List continued on next page.)

FOREIGN PATENT DOCUMENTS

| | | | |
|---|---|---|---|
| 0 555 860 A1 | 8/1993 | European Pat. Off. | |
| 41 23 235 C1 | 11/1992 | Germany. | |

(List continued on next page.)

OTHER PUBLICATIONS

Control of Vehicle Dynamics, Automotive Engineering, May 1995, pp. 87–93.
Consideration of Lateral & Longitudinal Vehicle Stability by Function Enhanced Brake & Stability Control System, SAE #940832, pp. 63–72.

(List continued on next page.)

*Primary Examiner*—Douglas C. Butler
*Attorney, Agent, or Firm*—Anthony Luke Simon

[57] ABSTRACT

In a vehicle with first and second front vehicle wheels and third and fourth rear vehicle wheels and at least one member of a first group comprising anti-lock brake control and positive acceleration traction control, a brake control method comprising the steps of: determining a desired vehicle yaw rate; determining an actual vehicle yaw rate; responsive to the desired and actual vehicle yaw rates, determining an axle command; responsive to the desired and actual vehicle yaw rates, determining a torque command; applying the axle command during activation of one of the anti-lock brake control and the positive acceleration traction control to one member of a second group comprising (i) the two front wheels and (ii) the two rear wheels, wherein wheel-to-road traction is increased and a difference between desired vehicle yaw rate and actual vehicle yaw rate is minimized; and applying the torque command to at least one of the vehicle wheels independently of the axle command to create a yaw torque moment on the vehicle body, wherein the difference between the desired vehicle yaw rate and the actual vehicle yaw rate is minimized.

11 Claims, 26 Drawing Sheets

U.S. PATENT DOCUMENTS

| | | | |
|---|---|---|---|
| 5,229,944 | 7/1993 | Yasuno | 364/426.01 |
| 5,275,475 | 1/1994 | Hartmann et al. | 303/103 |
| 5,341,297 | 8/1994 | Zomotor et al. | 364/426.016 |
| 5,366,281 | 11/1994 | Littlejohn | 303/3 |
| 5,402,342 | 3/1995 | Ehret et al. | 364/426.016 |
| 5,444,621 | 8/1995 | Matsunaga et al. | 364/424.05 |
| 5,480,219 | 1/1996 | Kost et al. | 303/146 |

FOREIGN PATENT DOCUMENTS

| | | |
|---|---|---|
| 41 21 954 A1 | 1/1993 | Germany . |
| 42 00 061 A1 | 7/1993 | Germany . |
| 42 23 385 A1 | 1/1994 | Germany . |
| 42 29 504 A1 | 3/1994 | Germany . |
| 43 11 077 A1 | 10/1994 | Germany . |
| 43 14 827 A1 | 11/1994 | Germany . |
| 405262213 A | 10/1993 | Japan . |
| 406024304 A | 2/1994 | Japan . |
| 406087421 A | 3/1994 | Japan . |
| 406115418 A | 4/1994 | Japan . |
| 406127354 A | 5/1994 | Japan . |
| 2 257 551 | 1/1993 | United Kingdom . |
| 2 263 340 | 7/1993 | United Kingdom . |
| 2269571 | 2/1994 | United Kingdom . |
| 2 275 312 | 8/1994 | United Kingdom . |

OTHER PUBLICATIONS

Spin Control For Cars, Steven Ashley, Associate Editor, Mechanical Engineering Jun. 1995, pp. 66–68.

May The Cornering Force Be With You; Popular Mechanics; Dec. 1995, pp. 74–77.

Stable As She Goes: Don Sherman, Automotive Industries, May 1995.

The Spin Doctors: Don Sherman, 12PS95.

Mercedes/Bosch ESP; Automotive Industries, Apr. 1995.

Controlling Vehicle Stability: Christopher A. Sawyer, Automotive Industries, Jan. 1995.

Let Magic Fingers Do The Driving: Wards Auto World; May 1995.

Technoid: Intelligent Brakes Are On The Way; Car and Driver, Aug. 1994.

Toyota Vehicle Stability Control System; Automotive Engineering, Aug. 1995.

Vehicle Dynamics Offers New Level Of Safety: Machine Design, Sep. 1994.

Handling Control Systems For Your Car: Popular Electronics; Feb. 1995.

VDC, The Vehicle Dynamics Control System Of Bosch: A. VanZanten, R. Erhardt and G. Pfaff; Robert Bosch GmbH; No. 950759, pp. 9–26.

BRAKE CONTROL SYSTEM

This invention relates to a brake control system and method.

BACKGROUND OF THE INVENTION

Automotive vehicles have been produced or demonstrated with brake systems that modulate brake force during stops to provide anti-lock brake control (ABS) and/or that modulate brake force during vehicle acceleration to provide positive acceleration traction control (TCS). Some such brake systems additionally provide brake-by-wire control.

SUMMARY OF THE PRESENT INVENTION

Advantageously this invention provides a brake control system for actively controlling the brakes of a motor vehicle.

Advantageously this invention provides a brake control system that provides closed loop yaw control by developing a yaw rate command from operator inputs such as vehicle speed and steering wheel position. This invention provides a control that minimizes yaw rate error, which is the difference between the yaw rate command and the actual vehicle yaw rate.

Advantageously, this invention recognizes that a vehicle handling response is dynamic, varying with vehicle speed in a non-linear manner. Closed loop control commands are provided through a control structure that is also dynamic, varying nonlinearly with vehicle speed as the vehicle handling response changes. According to one example, the control structure uses proportional and derivative terms determined using gains that vary nonlinearly with vehicle speed, thus matching the control response to the vehicle response.

Advantageously, according to another example, this invention provides closed loop control commands responsive to the yaw rate error in a dual command structure, a first command is provided as a front or rear axle command and a second command is provided as a left or right torque command. The axle command is provided to either of the front or rear axles to modify wheel speeds on those axles to increase wheel-to-road traction in a manner to vary the vehicle yaw rate. The torque command is provided to one or more wheels to impart a left or right torque moment on the vehicle body through modification of the braking action of the wheels. Actual vehicle yaw rate is monitored so that the closed loop control takes into account the results of the axle and torque moment commands when updating the commands.

Advantageously, according to a preferred example, this invention provides a brake control method for use in a vehicle with first and second front vehicle wheels and third and fourth rear vehicle wheels, the brake control method comprising the steps of: determining a desired vehicle yaw rate; determining an actual vehicle yaw rate; determining a vehicle speed; responsive to the vehicle speed and a first nonlinear control function, determining a proportional gain, wherein the proportional gain varies nonlinearly with vehicle speed; responsive to the vehicle speed and a second nonlinear control function, determining a derivative gain, wherein the derivative gain varies nonlinearly with vehicle speed; responsive to the proportional gain, the derivative gain and the desired and actual vehicle yaw rates, determining a torque command; applying the torque command to at least one of the vehicle wheels to create a yaw torque moment on the vehicle body, wherein a difference between the desired vehicle yaw rate and the actual vehicle yaw rate is minimized and wherein the brake control response varies nonlinearly with vehicle speed to match vehicle speed-related dynamics.

Advantageously, according to another preferred example, this invention provides a brake control method for use in a vehicle with first and second front vehicle wheels and third and fourth rear vehicle wheels and at least one member of a first group comprising anti-lock brake control and positive acceleration traction control, the brake control method comprising the steps of: determining a desired vehicle yaw rate; determining an actual vehicle yaw rate; responsive to the desired and actual vehicle yaw rates, determining an axle command; responsive to the desired and actual vehicle yaw rates, determining a torque command; applying the axle command during activation of one of the anti-lock brake control and the positive acceleration traction control to one member of a second group comprising (i) the two front wheels and (ii) the two rear wheels, wherein wheel-to-road traction is increased and a difference between desired vehicle yaw rate and actual vehicle yaw rate is minimized; and applying the torque command to at least one of the vehicle wheels independently of the axle command to create a yaw torque moment on the vehicle body with respect to the road surface, wherein the difference between the desired vehicle yaw rate and the actual vehicle yaw rate is minimized.

BRIEF DESCRIPTION OF THE DRAWINGS

The present invention will now be described by way of example with reference to the following drawings, in which.

DETAILED DESCRIPTION OF THE INVENTION

Figure 1:
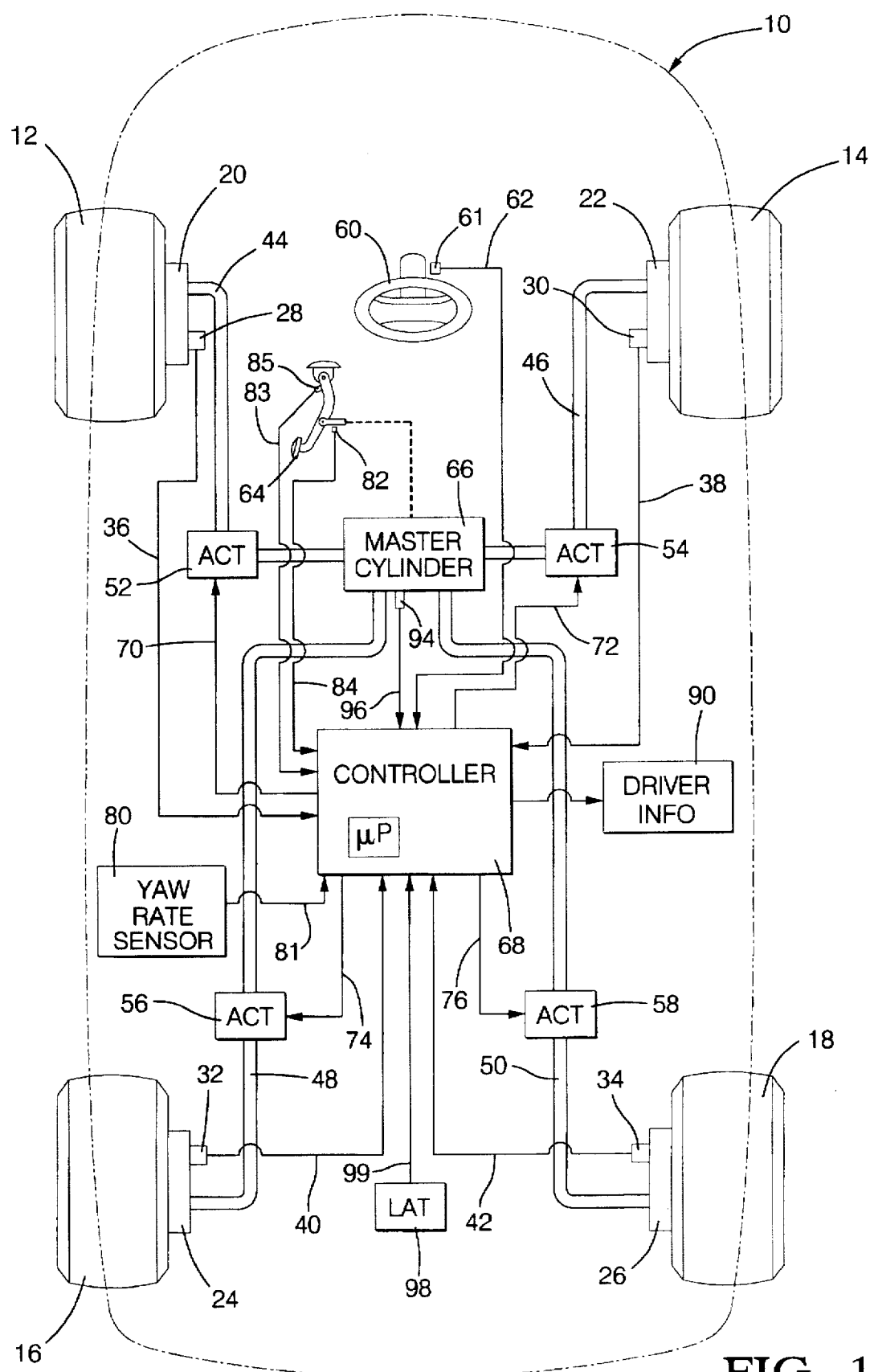
FIG. 1 is an example schematic of a vehicle brake control system according to this invention.

Referring to FIG. 1, the vehicle 10 shown includes a controllable brake system with controller 68 for controlling the brakes 20, 22, 24 and 26 for wheels 12, 14, 16 and 18, respectively. Various inputs to the controller 68 include the wheel speed signals on lines 36, 38, 40 and 42 from wheel speed sensors 28, 30, 32 and 34, the brake pedal switch signal on line 84 from brake pedal switch 82, the brake pedal extended travel signal on line 83 from pedal travel sensor 85 (optional), the steering wheel angle signal on line 62 from sensor 61 indicating the angle of steering wheel 60, the yaw rate signal on line 81 from yaw rate sensor 80, the master cylinder pressure signal on line 96 from master cylinder pressure sensor 94 (optional) and the lateral acceleration signal on line 99 from lateral accelerometer 98.

Each of the sensors 28, 30, 32, 34, 61, 80, 82, 85, 98 and 99 is implemented in a manner known to those skilled in the art. The brake pedal travel sensor 85 is a switch mounted to the pedal that provides an output signal when the pedal has been depressed an extended amount indicating "hard" braking by the driver.

In one example, the steering wheel position sensor 61 may be a digital sensor that provides output signals that increment a digital position signal within controller 68 with each degree or partial degree of movement of the steering wheel 60 in one direction and decrement the digital position signal with each degree or partial degree of movement in the opposite direction. The steering wheel sensor 61 may also include an analog sensor position output (i.e., from a rotary resistive device of a known type) that provides approximate steering wheel position information. The analog output can be used, for example, to determine whether the steering wheel is turned less than a preset limit, i.e., 90 degrees, at vehicle start-up. A method for determining the center position of the steering wheel position sensor is disclosed in pending U.S. patent application, Ser. No. 08/664,321, assigned to the assignee of this invention.

Responsive to the various inputs, the controller controls the braking of each wheel in anti-lock braking mode during certain braking maneuvers and in traction control mode during certain vehicle acceleration maneuvers to maintain tractive force of the drive wheels on the road surface. The anti-lock brake control and positive acceleration traction control are performed in a known manner except as modified herein.

The controller 68 also actively controls the wheel brakes 20, 22, 24 and 26 responsive to the actual vehicle yaw rate as measured by yaw rate sensor 80 to minimize the difference between the actual vehicle yaw rate and a desired vehicle yaw rate. Because the base braking, antilock braking and traction control functions are known to those skilled in the art, only a general description thereof will be set forth herein.

When the vehicle is in a braking maneuver, the controller monitors the wheel speed signals from sensors 28, 30, 32 and 34 and determines if one or more of the wheels is in or is about to be in an incipient lock-up condition, in which case anti-lock brake control mode for the one or more wheels is activated. In the anti-lock brake control mode, the controller 68 determines and outputs commands to the actuators 52, 54, 56 and 58 corresponding to the wheels in anti-lock brake mode to modulate brake force to the wheels. Through control of the actuators 52, 54, 56 and 58, the controller prevents the wheels from entering a lock-up condition while achieving effective brake control and steerability in a manner known to those skilled in the art of anti-lock brake control.

When the vehicle is not in a braking maneuver, but is accelerating due to output motive force from the vehicle prime mover, i.e., the internal combustion engine or electric motor, the controller 68 monitors the wheel speeds sensed by sensors 28, 30, 32 and 34 to determine if the wheels transferring motive force to the road surface are slipping or are about to slip. In such wheel conditions, the controller 68 sends commands to the actuators 52–58 corresponding to the wheels that are slipping or are about to slip to provide brake force to the wheels to reduce the slip. Such control is typically performed in conjunction with a parallel control in the engine or motor controller to temporarily reduce the motive force output until wheel to road traction is reestablished.

In one example, the brake actuators 52–58 are implemented as reciprocating piston actuators of a type known to those skilled in the art. Such actuators typically include a dc motor positionally controlling a reciprocating piston through a rotary to linear motion converter to increase and/or decrease hydraulic pressure in the wheel brakes. In another example, brake actuators 52–58 are implemented as solenoid valves for selectively coupling brakes 20–26 to a source of pressurized hydraulic fluid to increase brake pressure and for selectively coupling brakes 20–26 to a brake fluid reservoir to decrease brake pressure. Implementation of such solenoid valves is known to those skilled in the art. In yet another example, the rear brakes and/or the front brakes may be electric motor-driven brakes, in which case the actuator and brake functions are performed by the same unit. An example of a brake system including front hydraulic brakes and rear electric brakes in which all four brakes are drive-by-wire is set forth in U.S. Pat. No. 5,366,291, assigned to the assignee of this invention.

This invention performs an active brake control of the four wheel brakes 20–26 responsive to the steering wheel angle signal on line 62, the yaw rate signal on line 81, the vehicle speed as calculated responsive to the signals from the four wheel speed sensors and the lateral acceleration signal on line 99. Using these signals, controller 68 determines a desired vehicle yaw rate and compares that desired yaw rate to the actual yaw rate sensed by sensor 80. If the actual yaw rate of the vehicle differs from the desired yaw rate by more than a threshold that is dynamically determined, controller 68 determines and outputs commands to actuators 52, 54, 56 and 58 to control the vehicle wheel brakes 20, 22, 24 and 26 to bring the vehicle yaw rate into conformance with the desired yaw rate.

In carrying out these tasks, controller 68 typically includes a microprocessor, ROM and RAM and appropriate input and output circuits of a known type for receiving the various input signals and for outputting the various control commands to the actuators 52, 54, 56 and 58.

Figure 2:
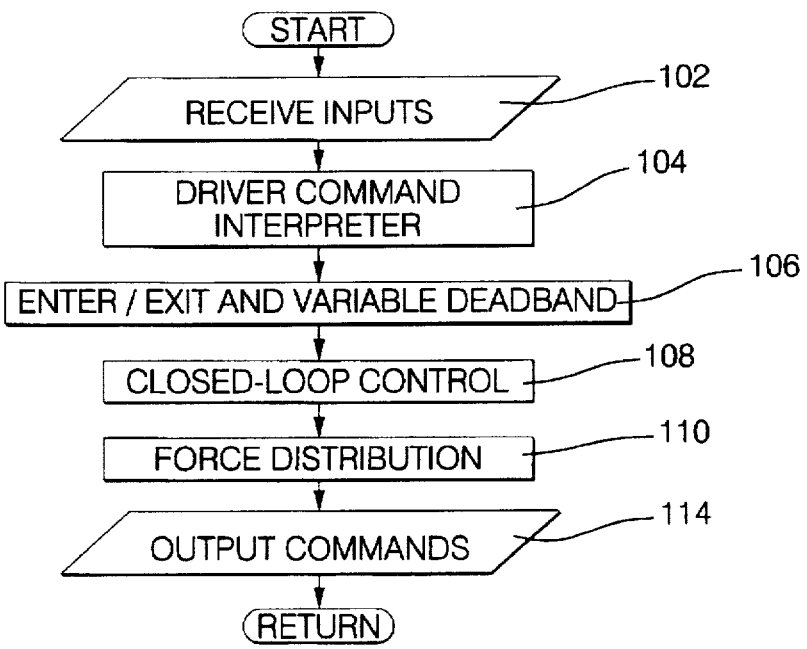
FIG. 2 illustrates a master flow diagram for example operation of controller 68 in FIG. 1.

Referring now to FIG. 2, a master flow diagram for control by the controller 68 is shown. The control starts and moves to block 102 where the controller receives the various inputs from the various sensors illustrated in FIG. 1. From block 102, the routine moves to block 104 where a subroutine is implemented to convert the sensor information received at block 102 into a desired yaw rate command, $\gamma_D$. In an example providing advantageously flexible control, block 104 determines two parallel desired yaw rate commands, and understeer command, $\gamma_{DU}$, and an oversteer command, $\gamma_{DO}$. The parallel running commands $\gamma_{DU}$ and $\gamma_{DO}$, are each maintained according to their own independent criteria allowing independent calibration of oversteer and understeer modes. The control described further below can then switch between the understeer and oversteer yaw rate commands, $\gamma_{DU}$ and $\gamma_{DO}$, as the vehicle switches between understeer and oversteer modes. The steps performed at block 104 are described in further detail with reference to FIGS. 6–17.

From block 104, the routine continues to block 106 where a variable dead band control is implemented. In general, the variable dead band control at block 106 determines, responsive to the various sensor signals received at block 102, whether the vehicle is in understeer or in oversteer mode. Block 106 also determines a yaw rate dead band, DB, which varies with the vehicle conditions as represented by the sensor signals and which may vary depending upon whether the vehicle is in understeer or oversteer mode.

The variable dead band control block 106 then determines whether actual vehicle yaw rate, $\gamma_M$, as measured by the yaw rate sensor 80, varies from the desired vehicle yaw rate as determined at block 104 by an amount greater than the dead band. If the difference between the actual yaw rate and the desired yaw rate is less than the dead band amount and the ABC flag is reset, indicating that active brake control is not active, then the ABC flag is maintained reset and active brake control is not performed at blocks 108–114. However, if the difference between the actual yaw rate, $\gamma_M$, and the desired yaw rate, $\gamma_D$, (also referred to as yaw rate error, $\Delta\gamma_E$) is greater than the dead band as determined by block 106, and if other criteria explained below are met, then the ABC flag is set to active, setting the active brake control active. If the ABC flag is active and the yaw rate error, $\Delta\gamma_E$, is less than an exit dead band, then an exit strategy from the active brake control is commenced and if the yaw rate error continues to be below the exit dead band throughout the exit procedure, then the ABC flag is reset, terminating active brake control until the yaw rate error again rises above the dead band.

The steps for performing the function of block 106 are described in detail below with reference to FIGS. 18–26.

From block 106, the routine continues to block 108 where a closed loop yaw rate control subroutine is implemented to provide yaw rate control commands responsive to the yaw rate error, $\Delta\gamma_E$, determined at block 106. The control at block 108 provides a dual command structure and preferably uses a PD or PID control for each of the dual structures.

More particularly, the dual structure addresses yaw rate error with both a front/rear control and a left/right control. The front/rear control recognizes that when front wheels or rear wheels undergo slip, the lateral force control provided by the wheels is reduced. By reducing the amount of slip experienced by the front or rear wheels, the lateral wheel-to-road force is increased. Thus, where appropriate, the front-to-rear control commands reduced slip at either the front axle or the rear axle to increase lateral force between either the front wheels and the road or the rear wheels and the road allowing the improved tractive force to reduce the YAW rate error.

In the second arm of the dual control structure, a left/right control operates on one or more of the four vehicle wheels independent of the front/rear control. The left/right control is designed to add a torque moment to the vehicle counter to the direction of yaw rate error, $\Delta\gamma_E$, to return the vehicle to the desired yaw rate, $\gamma_{DO}$ or $\gamma_{DU}$. This is achieved by either increasing brake pressure on one wheel, decreasing brake pressure on one wheel, or increasing brake pressure on one wheel and decreasing brake pressure on another wheel. The modification to the brake pressure(s) create the desired torque moment in the vehicle body to achieve the desired yaw control.

In a preferred example, this invention is implemented using closed loop wheel speed control and thus the front/rear command, $\Delta V_{FR}$, and the left/right command, $\Delta V_{FR}$, are determined as wheel delta velocity commands, that is, $\Delta V_{FR}$ and $\Delta V_{FR}$ command wheel speeds to be applied to certain of the vehicle wheels commanding those wheels to have a speed different from the reference speed of the wheels.

Figure 3:
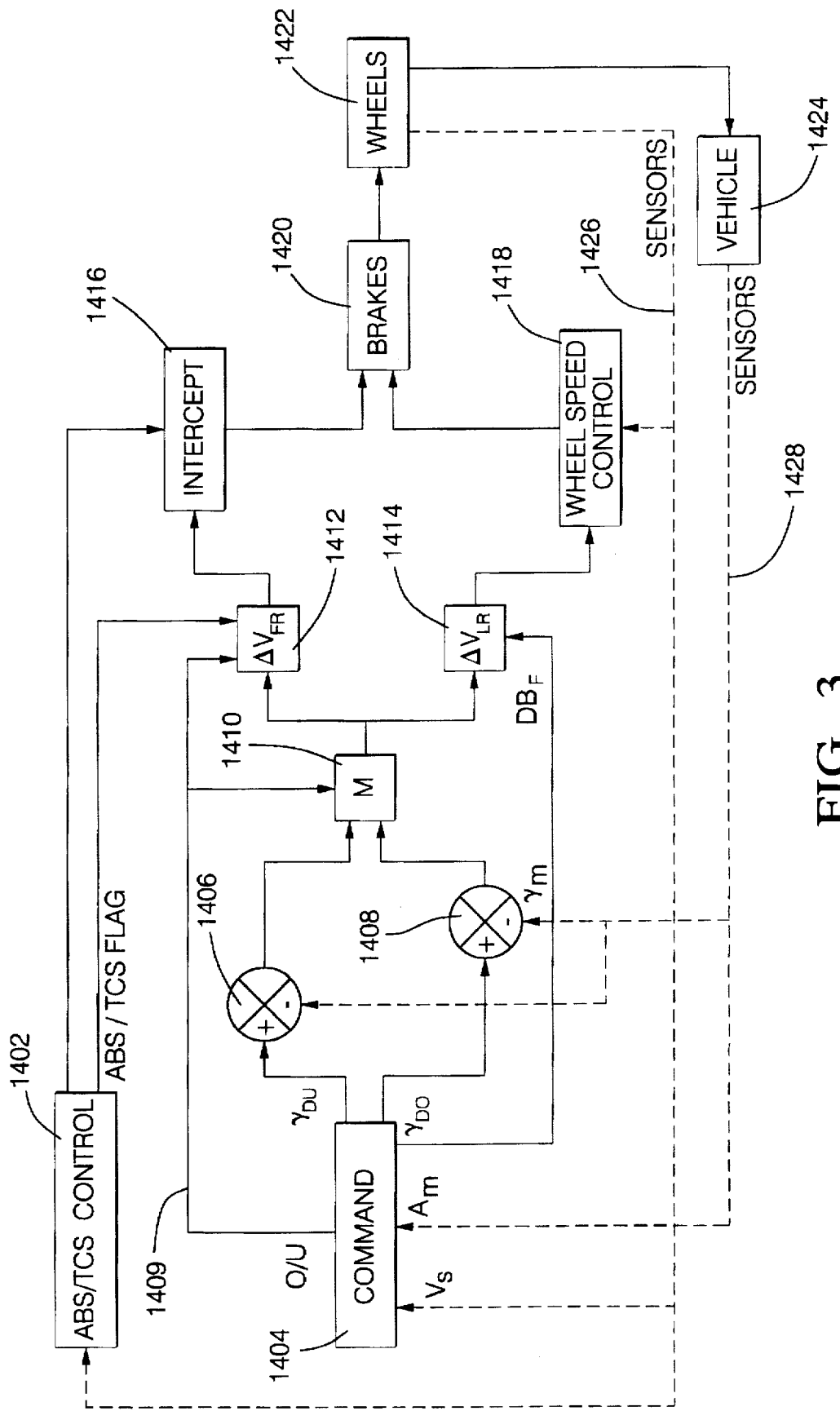
FIG. 3 illustrates an example control structure according to this invention.

Referring now to FIG. 3, the control structure for the closed loop control is shown. Block 1404 represents the command generator, for example, according to blocks 104 and 106 above, that provides understeer and oversteer desired yaw rates to blocks 1406 and 1408, respectively. Block 1406 subtracts the measured yaw rate from the understeer desired yaw rate and block 1408 subtracts the measured yaw rate from the oversteer desired yaw rate. The results of block 1406 and 1408 are provided to block 1410, which, for purposes of explanation, is shown as a multiplexer 1410.

Line 1409 carries a signal output by block 1404 indicating whether the vehicle is in oversteer or in understeer. If the vehicle is in oversteer, then block 1410 couples the output of block 1408 to command generators 1412 and 1414. Otherwise the output of block 1406 is coupled to command generators 1412 and 1414. The output of block 1410 represents the error between the actual vehicle yaw rate and the deadband.

Block 1412 responds to the error between the actual vehicle yaw rate and the deadband by generating the axle command $\Delta V_{FR}$, which, in the example shown, interacts with the operation of anti-lock brake and positive acceleration traction control block 1402. This interaction is represented by the intercept block 1416, which modifies (i.e., as described below with reference to FIGS. 32–34) the antilock brake and/or traction control commands to the wheel brakes represented by block 1420 to reduce wheel slip allowed on the axle (i.e., front wheels or rear wheels) being controlled by the antilock brake and/or traction control. The amount of reduction of allowed wheel slip is relational to the magnitude of the command from block 1412, which in turn is relational to the difference between the measured vehicle yaw rate and the deadband.

The effect of the control commanded by block 1412 on the vehicle wheels 1422 vis-à-vis the wheel brakes 1420 is sensed by the wheel speed sensors, represented by line 1426, and is provided back to the command block 1404 and the antilock and traction control block 1402. The effect of the control commanded by block 1412 on the vehicle body 1424 is measured by the vehicle yaw rate and lateral acceleration sensors, represented by line 1428, and provided back to the command block 1404.

Figure 4:
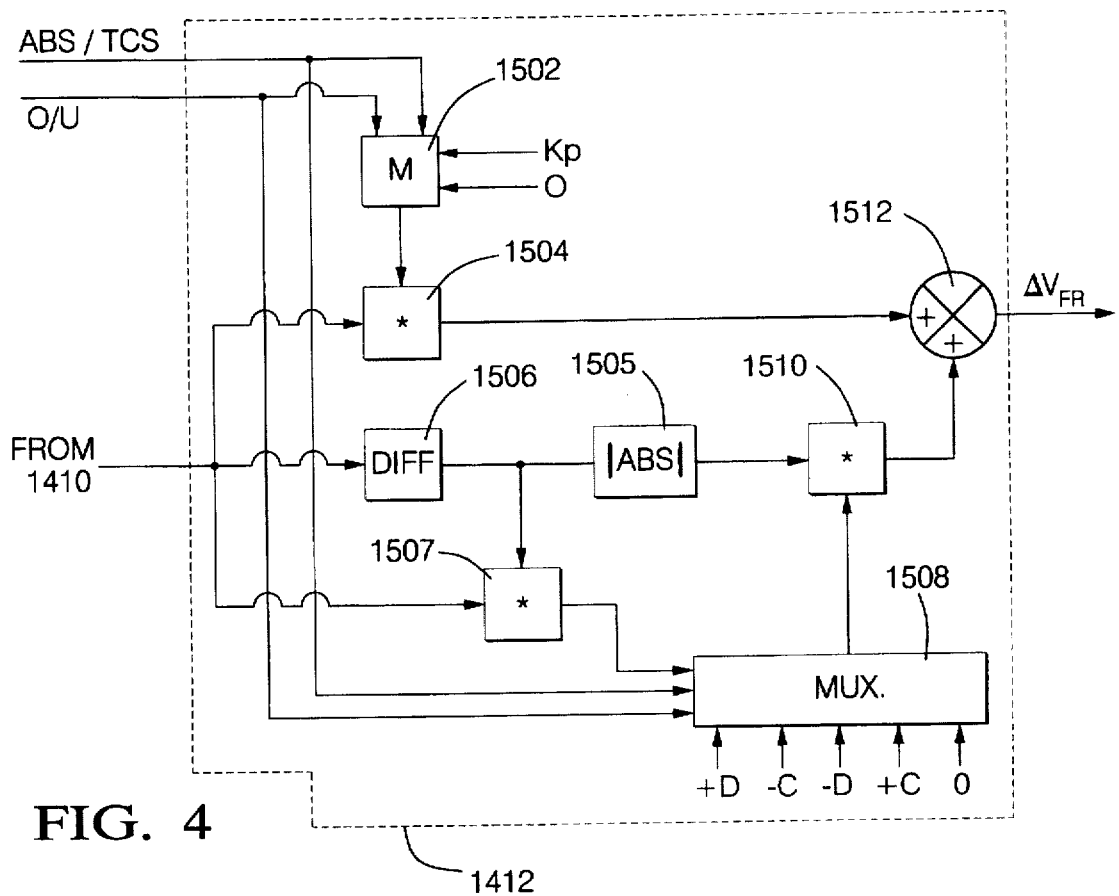
FIG. 4 illustrates an example control structure of block 1412 of FIG. 3.

Referring now to FIG. 4, the operation of block 1412 is shown in more detail. The flags indicating whether antilock brake control or positive acceleration traction control are active are provided to blocks 1502 and 1508. The flag indicating whether the vehicle is in oversteer or understeer is also provided to blocks 1502 and 1508. If the antilock brake control is active when the vehicle is in the understeer state (as indicated by the oversteer/understeer flag), then block 1502 sets the proportional gain to zero and block 1508 sets the derivative gain to zero. The proportional and derivative gains are also set to zero if all of the following conditions are met: the vehicle is in oversteer, the antilock brake control is inactive and the drive train is front wheel drive. Otherwise block 1502 sets the proportional gain equal to a predetermined constant and block 1508 sets the derivative gain as described below.

Block 1504 multiplies the output of block 1410 by the proportional gain and provides the result to block 1512. The output of block 1410 is also differentiated at block 1506 and the result is provided to blocks 1505 and 1507. Block 1507 multiplies the output of block 1506 by the output of block 1410 and provides the result to block 1508. Block 1508, shown as a multiplexer for purposes of explanation, selects the derivative gain based on the sign of the output of block 1507 and on whether the vehicle is in understeer or oversteer. If the vehicle is in understeer, and the output of block 1507 is positive, indicating that the yaw rate error is increasing, then a diverging gain is selected by block 1508 and given a positive sign. If the vehicle is in understeer and the output of block 1507 is negative, then a converging gain is selected at block 1508 and given a negative sign. If the vehicle is in oversteer and the output of block 1507 is positive, then a diverging gain is selected at block 1508 and given a negative sign. If the vehicle is in oversteer and the output of block 1507 is negative, then a converging gain is selected at block 1508 and given a positive sign. The converging and diverging gains may be set differently for oversteer and understeer modes.

Block 1505 imparts an absolute value function on the output of block 1506 and the result is provided to block 1510. Block 1510 multiplies the output of block 1508 by the output of block 1505 and the result is summed at block 1512 to the output of block 1504. The result of block 1512 is the axle command $\Delta V_{FR}$.

Referring again to FIG. 3, block 1414 responds to the error between the actual vehicle yaw rate and the deadband by generating the torque command $\Delta V_{LR}$, which, in the example shown, interacts with the vehicle wheel brakes 1420 through the wheel speed control block 1418 (described further below), commanding application and/or release of brake pressure to one or more of the wheel brakes. The brake control in this manner creates a difference in right-to-left braking forces, inducing a torque on the vehicle body with respect to the road surface to counter the vehicle yaw rate error. The resultant operation of the vehicle wheels is sensed by the wheel speed sensors 1426, and fed back to the wheel speed control 1418 and back to the command block 1404. The effect of the torque control on the vehicle body 1424 is measured by the yaw rate and lateral acceleration sensors 1428 and fed back to the command block 1404 and summation blocks 1406 and 1408.

Figure 5:
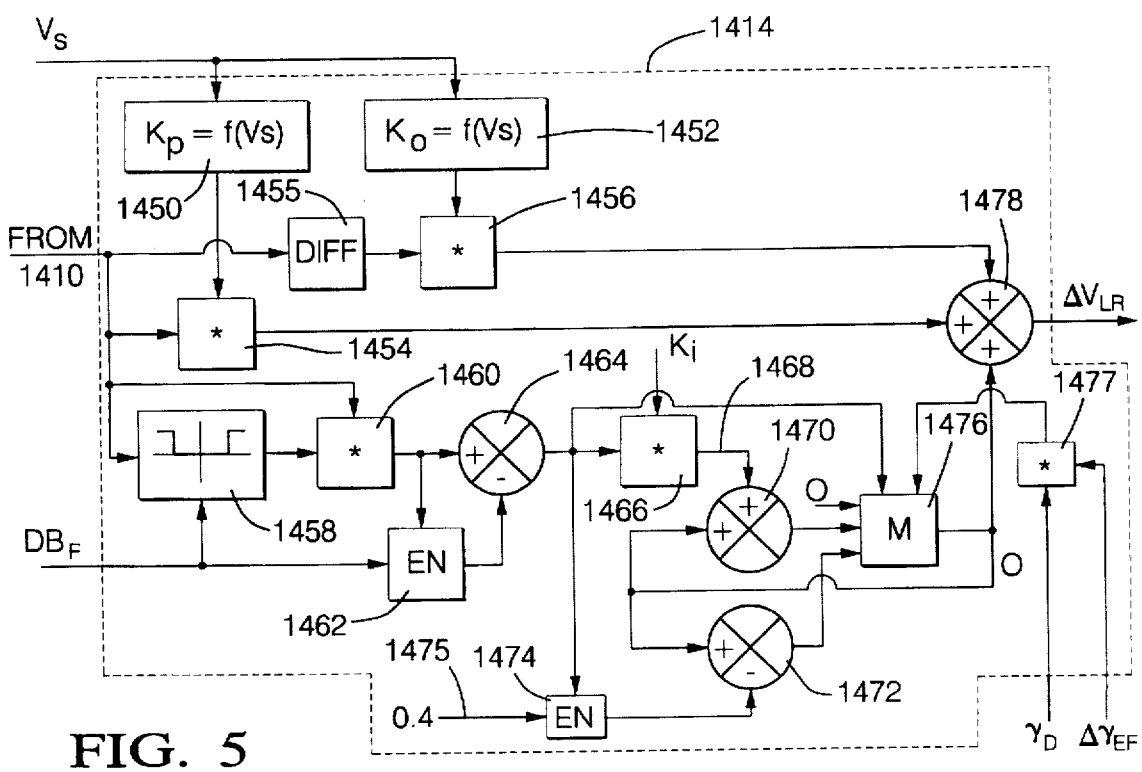
FIG. 5 illustrates an example control structure of block 1414 FIG. 3.

Referring now to FIG. 5, block 1414 is shown in more detail. Blocks 1450 and 1452 schedule the proportional and derivative gains nonlinearly with respect to vehicle speed. Selecting the gains in response to vehicle speed provides control advantages according to this invention conducive to the automotive vehicle. These advantages are explained as follows.

Figure 8:
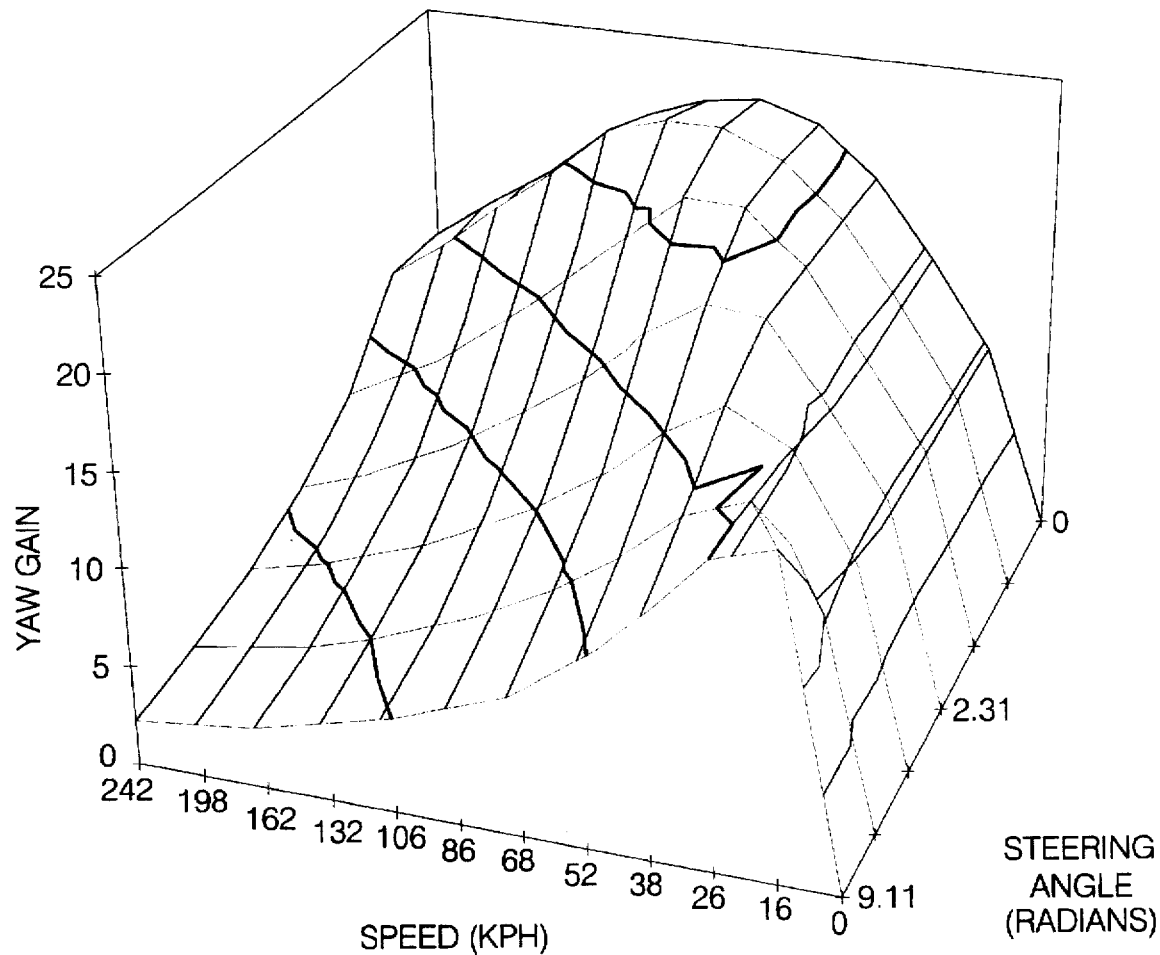
FIG. 8 illustrates a plot of an example yaw gain of a typical vehicle in response to vehicle speed and steering wheel angle.
Figure 9:
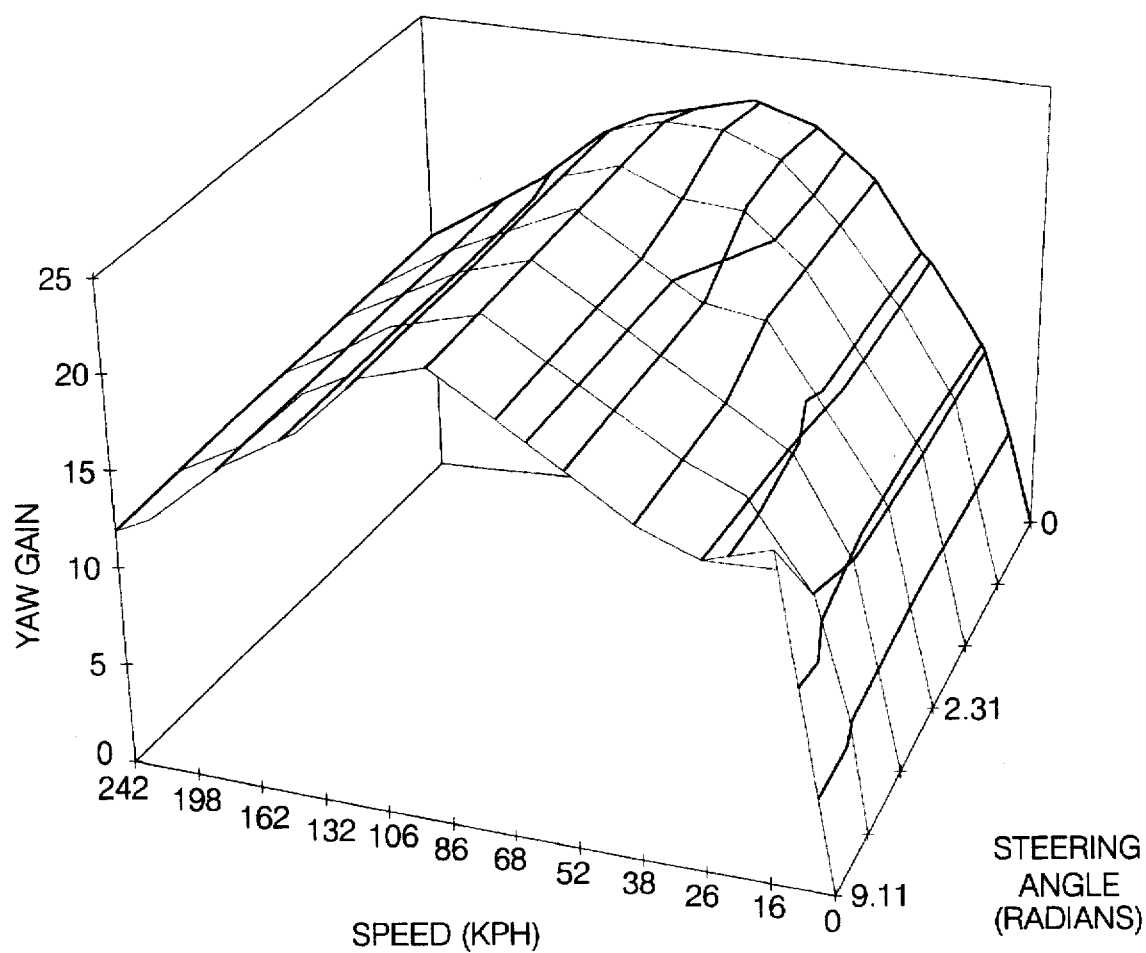
FIG. 9 illustrates a plot of an example yaw gain function according to this invention.

The automotive vehicle is a dynamic system in which the road performance varies with vehicle speed. An example of the dynamic nature of the vehicle is illustrated in FIG. 8, showing that as vehicle speed changes, the vehicle yaw gain in response to a steering input changes drastically. As is further apparent from FIG. 8, the change in yaw gain is nonlinear with respect to vehicle speed. By scheduling the proportional and differential gains with respect to vehicle speed, the gains for the control are also allowed to change nonlinearly with vehicle speed. Properly selecting the nonlinear gain functions (examples provided below with reference to FIG. 29) provides a control with a dynamic nonlinear response that varies with vehicle speed in a manner correlated with the nonlinear speed-related dynamics of the vehicle. In other words, the control response changes appropriately as the vehicle response changes with vehicle speed.

Block 1454 multiplies the result of block 1450 by the output of block 1410 and the result is provided to summation block 1478. Block 1455 differentiates the output of block 1410 and the result is multiplied at block 1456 by the output of block 1452. The result of block 1456 is also provided to summation block 1478.

The output of block 1410 is also provided to block 1458, which provides an output signal equal to zero if the magnitude of the output from block 1410 is less than the deadband determined by the command block 1404 (FIG. 2). Otherwise the output of block 1458 is set equal to one. Block 1460 multiplies the output of block 1458 by the output of block 1410 and the result is provided to summation block 1464 and to enabling block 1462, which enables the deadband to the summation block 1464 only if the output of block 1460 is not equal to zero. Block 1464 sums the outputs of blocks 1460 and 1462 (note, if the output of block 1460 is less than zero, then the output of block 1462 is summed in the positive, otherwise, it is summed in the negative). Block 1466 multiplies the output of block 1464 by the predetermined integral gain and the result is provided to block 1470.

Block 1470 sums the output of block 1466 with the output of block 1476 (described below) and provides the result to block 1476.

The output of block 1464 is also provided to enable block 1474, which enables the constant on line 1475 to block 1472 only when the output of block 1464 is equal to zero. If so, block 1472 subtracts the constant on line 1475 from the output of block 1476 and the result is provided to block 1476. Block 1476 is shown as a multiplexer that selects between the outputs of blocks 1470 and 1472 and the zero input. The zero input is selected whenever the output of block 1477, which multiplies the desired yaw rate by the filtered yaw rate error, is negative. A negative output by block 1477 indicates a change in steered direction of the vehicle has occurred. Otherwise, block 1476 selects the output of block 1470 when the output of block 1464 is not equal to zero and selects the output of block 1472 when the output of block 1464 is equal to zero.

Block 1478 sums the outputs of blocks 1454, 1456 and 1476 and provides the result as $\Delta V_{LR}$.

The above-described operation of blocks 1458–1477 provide increased response of the control by limiting the operation of the integral term. In general, integral terms add an ability to correct for steady state error at the price of building additional lag into the system. Blocks 1458–1477 limit the lag of the system for example: (a) by providing a fixed aggressive decay rate (blocks 1472 and 1474) when the output of block 1410 is less than the deadband; and (b) by resetting the integral term to zero (blocks 1476 and 1477) whenever a change in steering direction occurs. These functions are used in fast moving dynamic situations where the actual vehicle yaw rate is traversing in and out of the deadband and/or where the steering wheel direction is changed (i.e., as would occur in rapid lane change maneuvers) to minimize the effects of the integral term. However, during steady state situations, such as in a long turn on a freeway entrance ramp, the beneficial effects of the integral term in reducing steady state error are maintained.

The control steps performed by block 108 and the structure shown in FIGS. 3–5 are described below in more detail with reference to FIGS. 27–31.

At block 110, the controller performs a force distribution control which applies the commands $\Delta V_{FR}$ and $\Delta V_{LR}$ to the vehicle wheels. In general, the force distribution control at block 110 operates as follows. If the vehicle is in an anti-lock braking mode in which the vehicle brakes are controlled by driver commanded braking to prevent wheel lock up, the left/right command is applied to only one of the four vehicle wheels to command a release of brake pressure at the vehicle wheel, introducing the desired torque moment in the vehicle body by the left-to-right brake difference resulting from the commanded release.

If the vehicle is in a positive acceleration traction control mode in which a spin or speed difference between actual and reference wheel speeds is controlled to a target value to keep the driven wheels from spinning loose then the left/right control command is applied to only one of the four vehicle wheels to apply brake pressure to that wheel. The brake pressure applied to the one wheel creates a left-to-right brake difference creating a torque moment on the vehicle body to reduce the YAW rate error. If the vehicle is not in anti-lock braking mode or positive acceleration traction control mode, then the left/right yaw control command is applied to two of the four vehicle wheels releasing brake pressure in one of the wheels and applying brake pressure to the other. The resulting difference in left right brake forces create a torque moment on the vehicle body that minimizes the yaw rate error.

Block 110 also interacts the front/rear control with the anti-lock brake and positive acceleration traction controls. When the anti-lock brake control is active, $\Delta V_{FR}$, is applied by modifying the amount of braking to one of the axles, i.e., the rear axle, reducing the average brake pressure to that axle, increasing that axle's holding force on the road surface. During positive acceleration traction control, the front/rear command, $\Delta V_{FR}$, is applied by reducing the target wheel spin. This has the effect of reducing the average wheel spin during acceleration, increasing the lateral holding force of the drive wheels.

The control steps performed by the controller in carrying out the force distribution at block 110 are described below with reference to FIGS. 32–42.

From block 110 the routine continues to block 114 where the brake control commands are output, transferring the brake control commands as modified by the closed loop yaw control provided herein to the vehicle wheel brakes to achieve the desired yaw rate control.

Referring now to FIGS. 6–17, example steps performed by the controller in carrying out the driver command interpreter, block 104 of FIG. 2, are now described in more detail.

Figure 6:
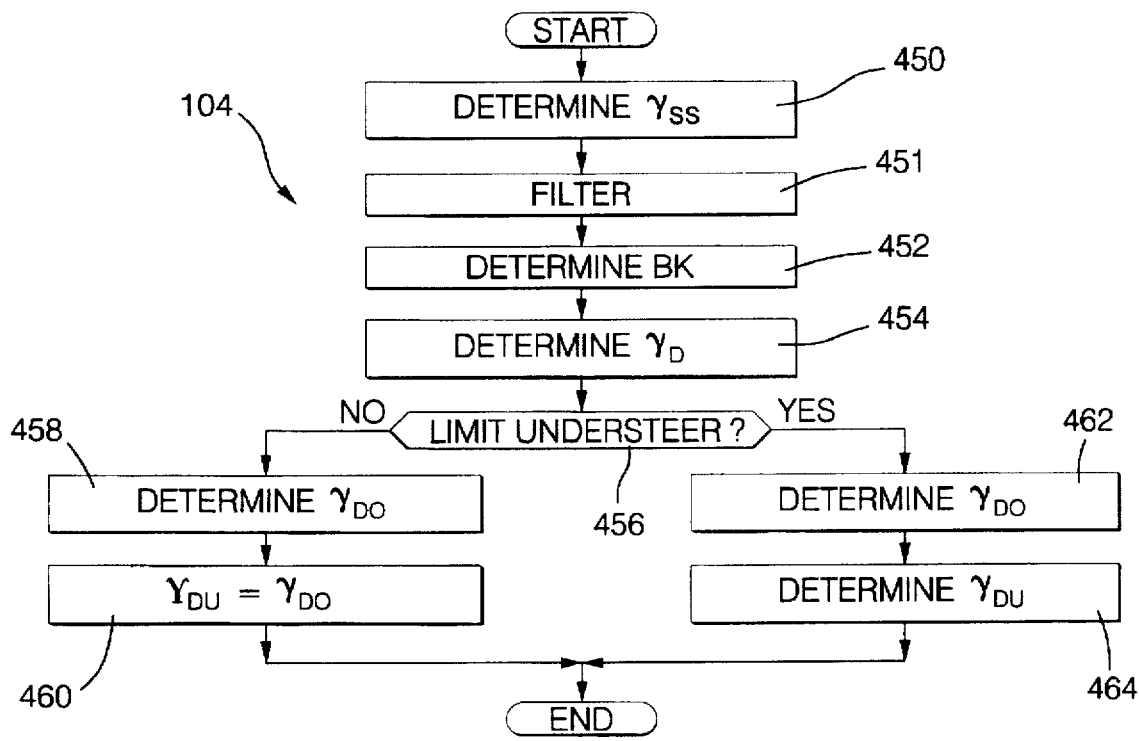
FIG. 6 illustrates an example flow control for block 104 of FIG. 2.

FIG. 6 illustrates a main subroutine performed by the driver command interpreter. At block 450, the routine determines a desired steady state yaw rate command, $\gamma_{SS}$, as described below with reference to FIG. 7. Block 451 filters the command $\gamma_{SS}$ and then block 452 determines a bank angle compensation term, BK, as described below with reference to FIG. 10. At block 454 the routine determines the desired yaw rate, $\gamma_D$, as the sum of $\gamma_{SS}$ and BK.

Block 456 is shown as a decision block to illustrate two possible implementations of this invention. In one example implementation, as shown by blocks 458 and 460, the control routine retains as much command authority during understeer as it retains during oversteer whereas in the example shown by blocks 462 and 464, the understeer authority is limited to temper the system's response to occurrence of understeer. The decision to use blocks 458 and 460 or blocks 462 and 464 can be preprogrammed as a preset variable for a particular car line.

In the example where understeer authority is not limited differently than oversteer authority, the routine moves to block 458 where it determines the oversteer desired yaw rate command, $\gamma_{DO}$, as described below with reference to FIG. 12 then moves to block 460 where it sets the understeer desired yaw rate command, $\gamma_{DU}$, equal to the oversteer desired YAW rate command. If the understeer desired yaw rate command is to be limited, block 462 determines $\gamma_{DO}$ as described below with reference to FIG. 12 and then block 464 determines $\gamma_{DU}$ as described below with reference to FIG. 15.

As will be described in more detail below, the over and understeer yaw rate commands, $\gamma_{DO}$ and $\gamma_{DU}$, are continuously updated with each control loop of the control routine and each depends both on $\gamma_D$ and on previous values of $\gamma_{DU}$ or $\gamma_{DO}$, whichever is appropriate. This invention provides the advantage of continuously updating both the understeer and oversteer yaw rate commands allowing easy switching between understeer and oversteer yaw rate control if the vehicle quickly switches between understeer and oversteer states.

Figure 7:
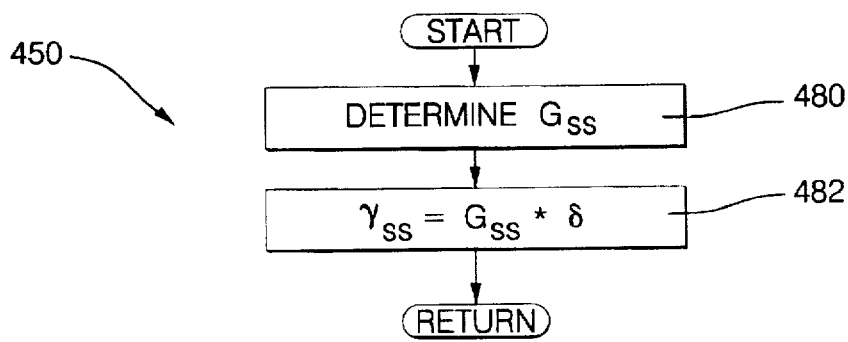
FIG. 7 illustrates an example flow control of block 450 of FIG. 6.

Referring now to FIG. 7, the subroutine for determining the steady state desired yaw rate, $\gamma_D$, is shown. At block 480 a steady state yaw gain, $G_{SS}$, is determined as the output of a look-up table whose inputs are vehicle speed, $V_S$, and steering wheel angle, $\delta$. Preferably, the look-up table flexibility adds an advantageous characteristic of the steady state yaw gain by maintaining the gain substantially linear with respect to steering wheel angle when the vehicle is in both linear and nonlinear driving modes. This can be better understood with reference to the following two tables (plotted in FIGS. 8 and 9).

TABLE 1

| $V_s(KPH)\backslash\delta(°)$ | 0 | 29.7 | 76.5 | 131 | 221 | 352 | 520 |
|---|---|---|---|---|---|---|---|
| 0 | 0 | 0 | 0 | 0 | 0 | 0 | 0 |
| 16 | 9.6 | 9.6 | 9.4 | 9.4 | 9.8 | 11.2 | 16.8 |
| 26 | 14.4 | 14.4 | 14.2 | 14.4 | 15.2 | 15.6 | 15.8 |
| 38 | 18.6 | 18.6 | 18.8 | 18.6 | 17 | 14.4 | 12.2 |
| 52 | 21.2 | 21.6 | 21.4 | 19 | 15 | 11.6 | 9.4 |
| 68 | 22.2 | 23 | 21.6 | 16.8 | 12.2 | 9.4 | 7.2 |
| 86 | 21.6 | 23 | 19 | 14 | 10.2 | 7.6 | 5.8 |
| 106 | 20.6 | 22 | 16.2 | 11.8 | 8.4 | 6.2 | 4.8 |
| 132 | 18.4 | 19.4 | 13.8 | 9.8 | 6.8 | 5 | 3.8 |
| 162 | 16.2 | 17 | 11.4 | 8 | 6.5 | 4 | 3.2 |
| 198 | 14.2 | 14.4 | 9.6 | 6.6 | 4.6 | 3.4 | 2.6 |
| 242 | 12 | 12.2 | 7.8 | 5.4 | 3.8 | 2.8 | 2.2 |

TABLE 2

| $V_s(KPH)\backslash\delta(°)$ | 0 | 29.7 | 76.5 | 131 | 221 | 352 | 520 |
|---|---|---|---|---|---|---|---|
| 0 | 0 | 0 | 0 | 0 | 0 | 0 | 0 |
| 16 | 9.6 | 9.6 | 9.4 | 9.4 | 9.8 | 11.2 | 16.8 |
| 26 | 14.4 | 14.4 | 14.2 | 14.4 | 15.2 | 15.6 | 15.8 |
| 38 | 18.6 | 18.6 | 18.8 | 18.6 | 17 | 17 | 17 |
| 52 | 21.2 | 21.6 | 21.4 | 19 | 19 | 19 | 19 |
| 68 | 22.2 | 23 | 21.6 | 21 | 21 | 21 | 21 |
| 86 | 21.6 | 23 | 23 | 23 | 23 | 23 | 23 |
| 106 | 20.6 | 22 | 22 | 22 | 22 | 22 | 22 |
| 132 | 18.4 | 19.4 | 19 | 19 | 19 | 19 | 19 |
| 162 | 16.2 | 17 | 17 | 17 | 17 | 17 | 17 |
| 198 | 14.2 | 14 | 14 | 14 | 14 | 14 | 14 |
| 242 | 12 | 12 | 12 | 12 | 12 | 12 | 12 |

Table 1 illustrates an example yaw gain of a typical vehicle in response to vehicle speed and steering wheel angle. As can be seen, for low steering wheel angles and at low vehicle speeds, the gain is substantially constant. As steering wheel angle increases past a certain point, or as vehicle speed increases past a certain point, the yaw gain becomes nonlinear (see the portions of table 1 in italics), decreasing as steering wheel angle increases and/or vehicle speed increases. The look-up table function used according to this invention is shown with respect to Table 2, which illustrates by the italicized numerals that even when the vehicle is in the nonlinear operating region, the yaw gain is maintained constant with respect to steering wheel angle. Since the yaw gain affects the desired yaw rate, $\gamma_D$, to which the vehicle is controlled, the system thereby provides a linear response to operator steering wheel inputs even when the vehicle is in a nonlinear operating condition, i.e., even when one or more sets of tires is experiencing lateral slippage.

From block 480, the routine continues to block 482 where the desired steady state yaw rate, $\gamma_{SS}$, is set equal to $G_{SS}$ multiplied by $\delta$. After block 482, the subroutine at block 450 is completed.

Figure 16:
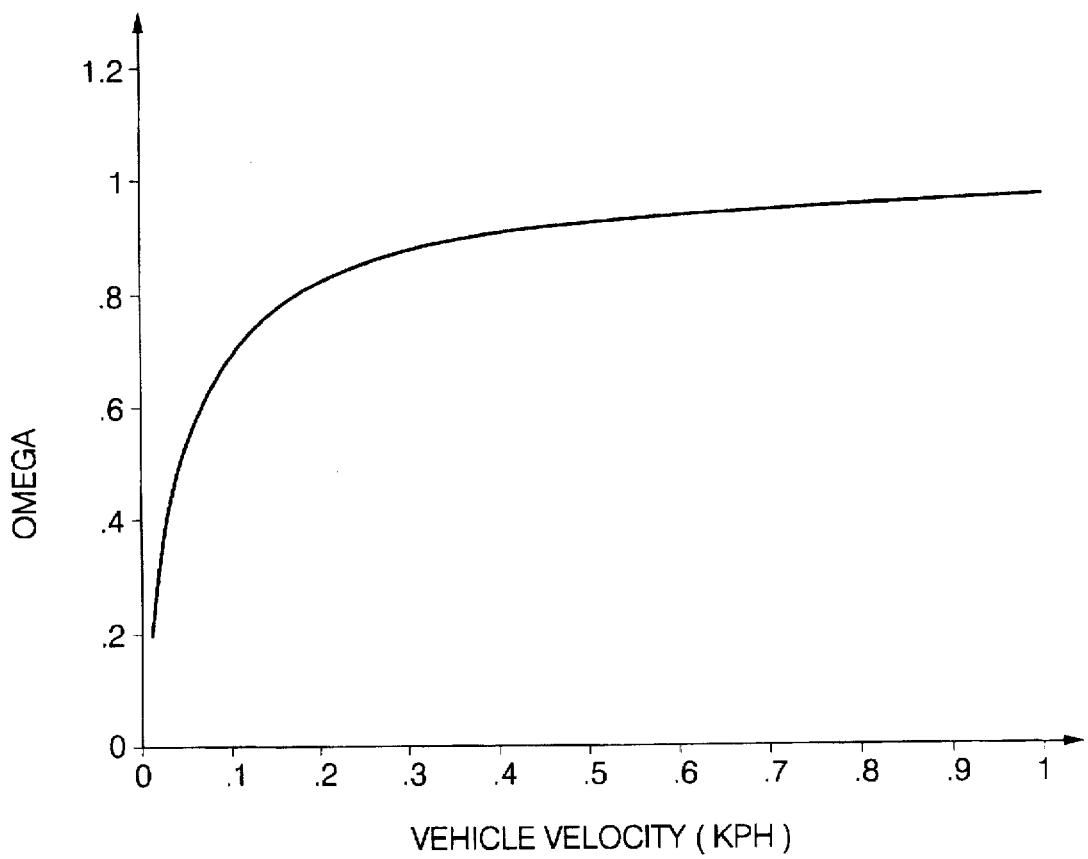
FIG. 16 illustrates an example plot of a coefficient for a filter implemented at block 451 in FIG. 6.
Figure 17:
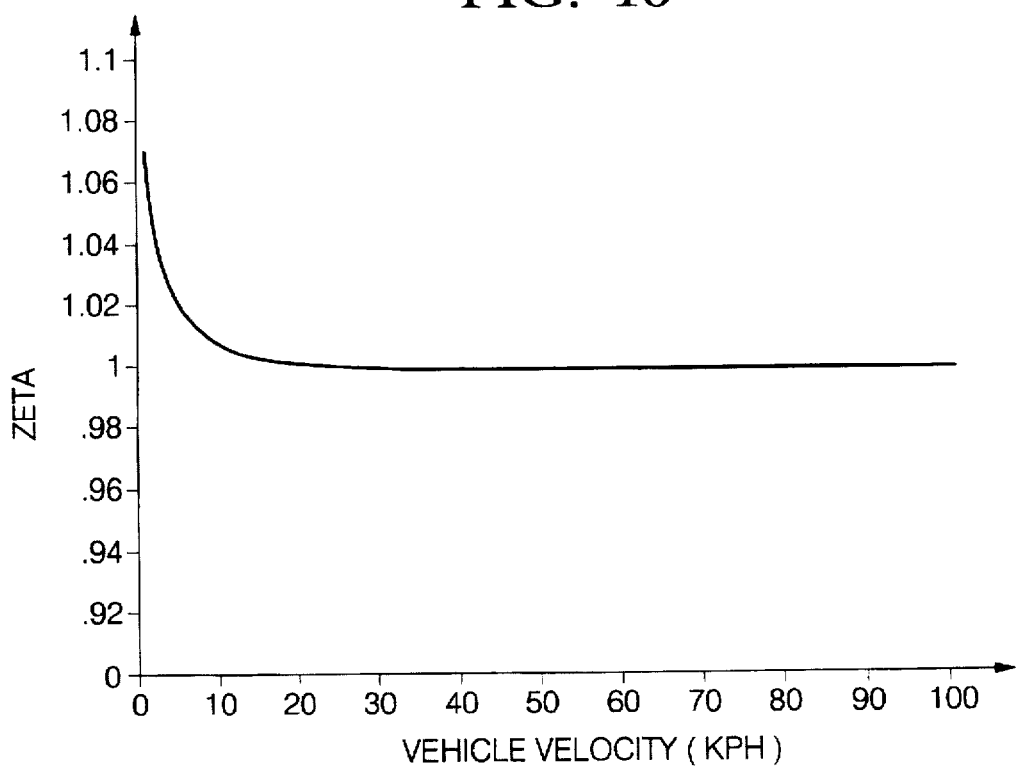
FIG. 17 illustrates an example plot of another coefficient for a filter implemented at block 451 of FIG. 6.

Referring again to FIG. 6, the filter at block 451 is implemented, for example, as a second order filter by first determining a set of coefficients, $\omega$ and $\zeta$, from look-up tables as a function of vehicle speed. Example look-up table functions for the coefficients $\omega$ and $\zeta$ are shown in FIGS. 16 and 17. The desired steady state yaw rate, $\gamma_{SS}$, is filtered using the filter coefficients determined at block 451 according to the equation:

$$y(n)=2, *\zeta*\omega*y(n-1)-\omega^2*y(n-2)+K1*x(n),$$

where $x(n)$ is the input to the filter, which is $\gamma_{SS}$, $y(n)$ is the filter output, $\gamma_{SSF}$, and K1 is determined according to:

$$K1=1-2*\omega*\zeta+\omega^2.$$

Figure 10:
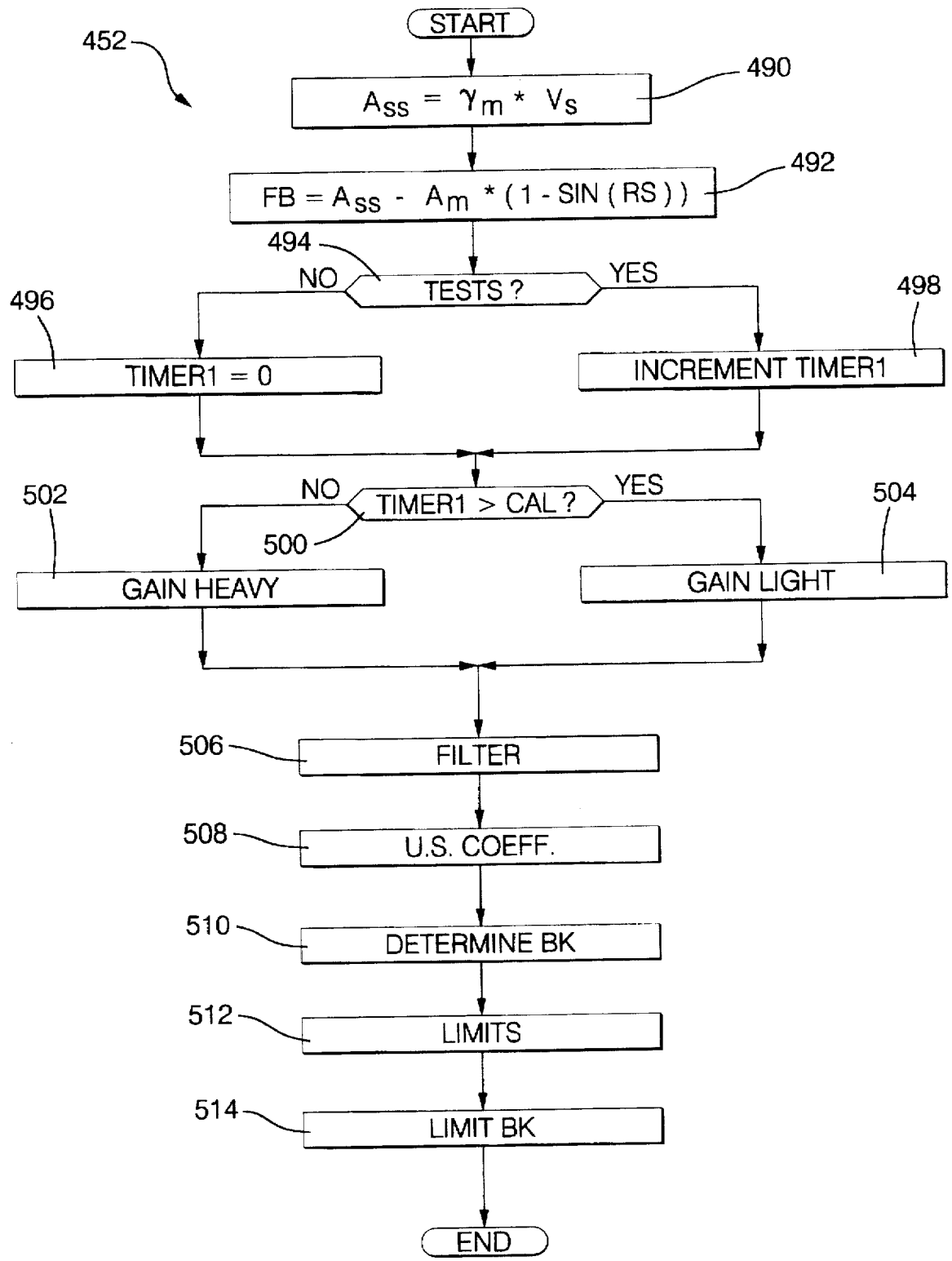
FIG. 10 illustrates an example flow control of block 452 of FIG. 6.

Referring now to FIG. 10, the subroutine executed by block 452 in FIG. 6 begins at block 490 where it computes a value of steady state lateral acceleration, $A_{SS}$, by multiplying the measured yaw rate, $\gamma_M$, by vehicle speed, $V_S$. Then, at block 492, the routine determines a feedback value, FB, representing a difference between $A_{SS}$ and lateral acceleration as measured by the lateral accelerometer, $A_M$, taking into account the roll stiffness of the vehicle:

$$FB=A_{SS}-A_M*(1-SIN(RS)),$$

where RS is a predetermined constant representing the roll stiffness of the vehicle, having an example value of 6 degrees/g.

At block 494, the routine checks whether the ABC flag is reset, whether the absolute value of yaw rate error, $\Delta\gamma_E$, as determined by the closed loop control block 108 (FIG. 2) is less than a predetermined value, for example, 4 degrees/s, whether the absolute value of the steering rate ($d\delta/dt=(\delta(n)-\delta(n-1))/0.01$), which is the differentiated value of the steering wheel position signal) is less than a predetermined constant, for example, 80 degrees/s, and whether the absolute value of $\gamma_M$ is less than a predetermined constant, for example 60 degrees/s. If the four tests are true at block 494, the routine continues to block 498 where a value TIMER1 is incremented. Otherwise the routine continues to block 496 where TIMER1 is reset to zero.

From block 496 or 498, the routine continues to block 500 where it compares TIMER1 to a predetermined constant, for example, 0.5 s. A condition of TIMER1 over 0.5 seconds indicates that the vehicle is in a steady state yaw maneuver as opposed to a dynamic maneuver. If TIMER1 is not greater than the predetermined constant, the routine continues to block 502 where it sets a feedback filter gain, $G_{FB}$, equal to a first value representing heavy filtering. Otherwise the routine continues to block 504 where it sets $G_{FB}$ equal to a second value representing light filtering. $G_{FB}$ is then used at block 506 to filter the value FB according to the equation:

$$y(n)=A*x(n)+(1-A)*y(n-1),$$

where y(n) is the filter output x(n) is the filter input and A is the filter gain, i.e., 0.04, assuming a 0.01 s control loop time.

Figure 11:
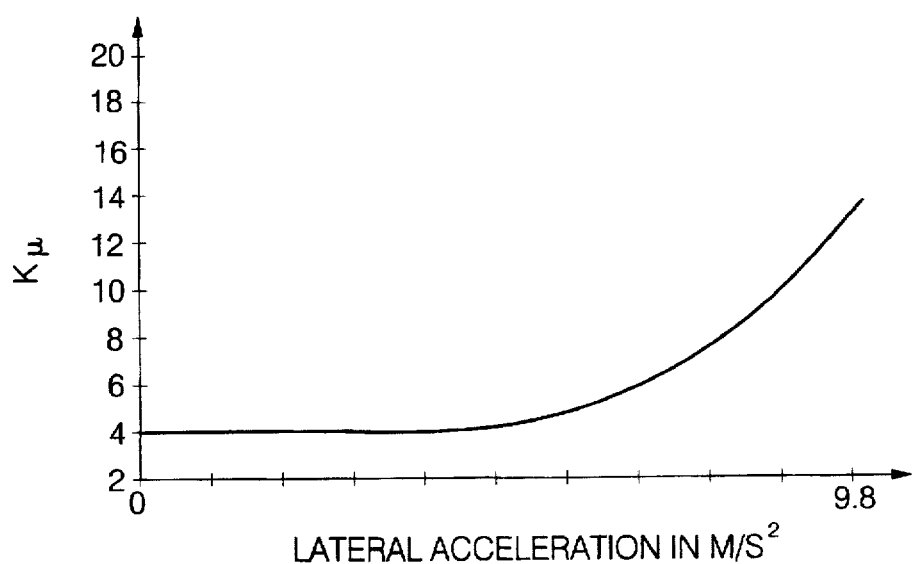
FIG. 11 illustrates an example plot of a look-up table function of block 508 of FIG. 10.

From block 506 the routine continues to block 508 where the understeer coefficient $K_U$ is determined from a look-up table responsive to $A_{SS}$. An example function of the look-up table is shown in FIG. 11 illustrating that the understeer coefficient $K_U$ is generally constant for low vehicle accelerations and then increases once the vehicle lateral acceleration rises above 0.4 g.

At block 510 a bank angle compensation term, BK, is computed according to the equation:

$$BK = FB * K_U * V_s / (L + K_U * V_s^2),$$

where L represents the wheel base of the vehicle. Block 512 sets the bank angle compensation upper and lower limits to plus or minus a predetermined value, for example 4 degrees/s, and then block 514 limits BK to the upper and lower bank angle compensation limits. After block 514, the subroutine 452 for determining the bank angle compensation is completed.

Figure 12:
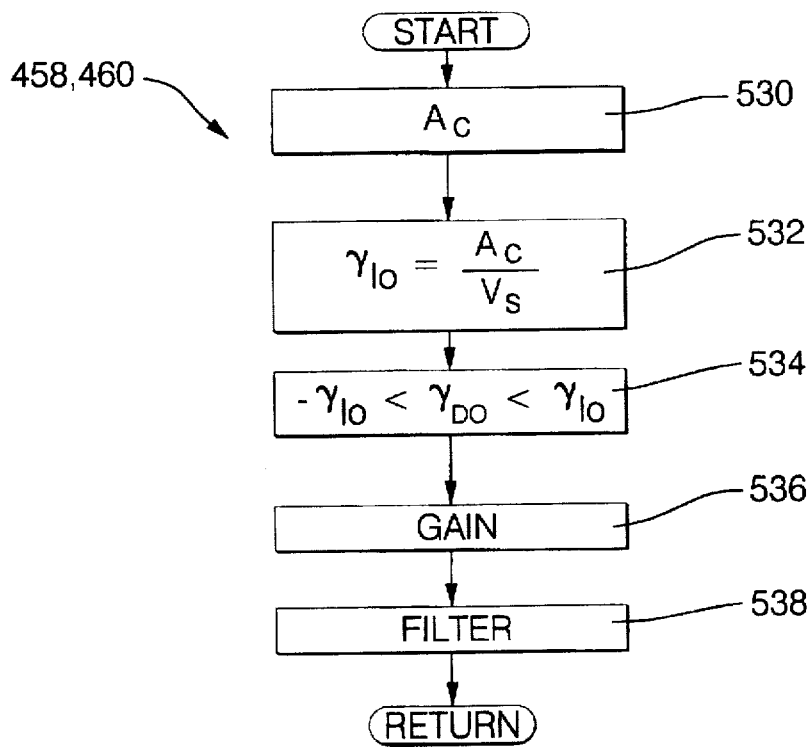
FIG. 12 illustrates an example flow control of blocks 458 and 460 of FIG. 6.

Referring now to FIG. 12, the steps performed by the subroutines 458 and 462 for determining $\gamma_{DO}$ are shown. At block 530 the routine sets $A_C$, representing maximum commanded lateral acceleration, equal to a predetermined value, for example 1.0 g. At block 532, the routine sets the value oversteer desired yaw rate limit, $\gamma_{LO}$, according to the equation:

$$\gamma_{LO} = A_c / V_s.$$

At block 534, the oversteer desired yaw rate, $\gamma_{DO}$, is set equal to $\gamma_D$ if $\gamma_D$ is within $+/-\gamma_{LO}$, equal to $-\gamma_{LO}$ if $\gamma_D$ is less than $-\gamma_{LO}$ and equal to $+\gamma_{LO}$ if $\gamma_D$ is greater than $+\gamma_{LO}$.

Figure 13:
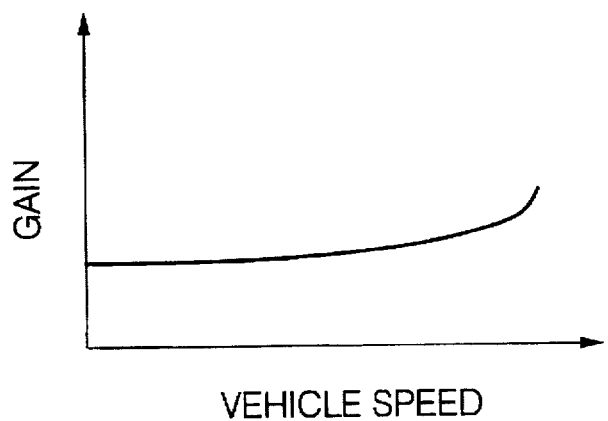
FIG. 13 illustrates an example plot of a look-up table function of block 536 of FIG. 12.

Next block 536 retrieves a filter gain from a look-up table responsive to vehicle speed. The look-up table function is shown in FIG. 13. Block 538 uses the retrieved gain in a first order lag filter to filter $\gamma_{DO}$ to determine $\gamma_{DOF}$ using a filter similar to that described above with reference to block 506.

Figure 14:
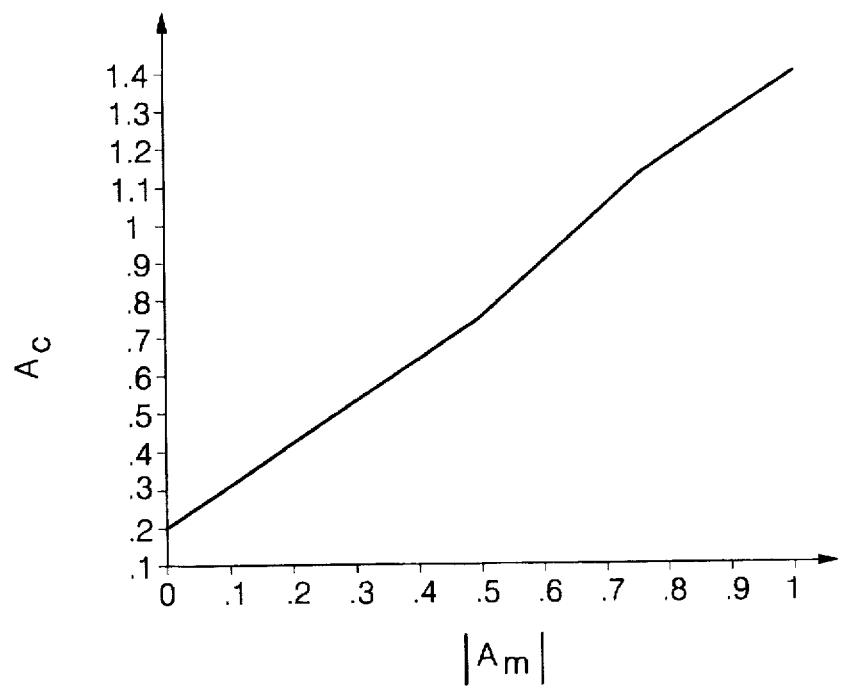
FIG. 14 illustrates an example plot of a look-up table function of block 550 of FIG. 15.
Figure 15:
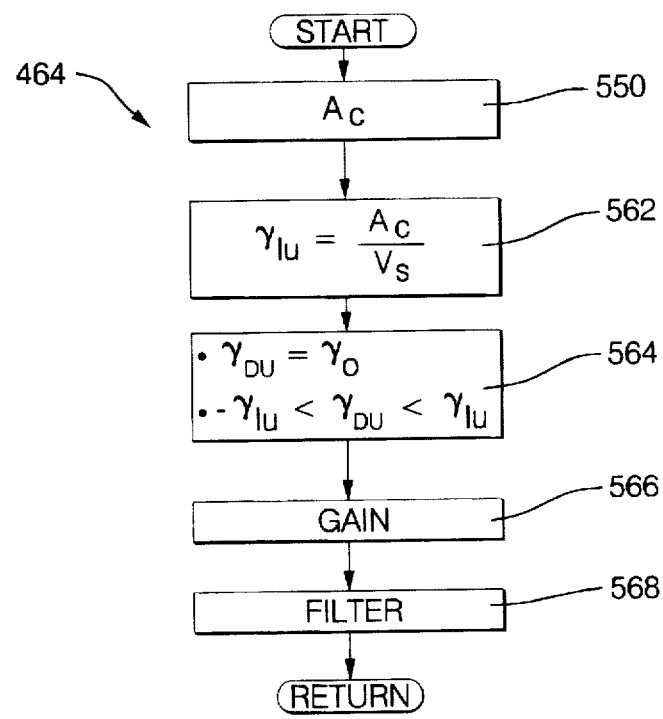
FIG. 15 illustrates an example flow control of block 464 of FIG. 6.

Referring now to FIG. 15, the steps of block 464 (FIG. 6) for determining the understeer desired yaw rate, $\gamma_{DU}$, are shown. At block 550, $A_C$ is determined from a look-up table as a function of the measured lateral acceleration, $A_M$. An example look-up table function is illustrated in FIG. 14. The table function allows tailoring of $A_C$ responsive to vehicle speed and builds in upper and lower limits to allow a distinct understeer response. For example, $A_C$ is set to allow some understeer to give the driver a more natural feel to the vehicle. Then at block 562, the understeer desired yaw rate limit, $\gamma_{LU}$, is determined as:

$$\gamma_{LU} = A_c / V_s.$$

Then at block 564, the understeer desired yaw rate, $\gamma_{DU}$, is set equal to $\gamma_D$ if $\gamma_D$ is within $+/-\gamma_{LU}$, equal to $-\gamma_{LU}$ if $\gamma_{DU}$ is less than $-\gamma_{LU}$ and equal to $+\gamma_{LU}$ if $\gamma_D$ is greater than $+\gamma_{LU}$.

Blocks 566 and 568 perform the same filter function on $\gamma_{DU}$ as described above with reference to blocks 536 and 538 (FIG. 12) to determine the filtered understeer desired yaw rate $\gamma_{DUF}$.

After block 568, the subroutine 464 for determining the understeer desired YAW rate is completed.

As an alternative to blocks 450, 452 and 454 (FIG. 6), the desired yaw rate, $\gamma_D$, may be determined according to the following equation:

$$\gamma_D = V_s * (\delta - K_U * A_M) / L,$$

where $\delta$ is the steering wheel angle, $A_M$ is the output of the lateral accelerometer, $K_U$ is the understeer coefficient of the vehicle and L is the wheel base of the vehicle. The system designer can alter the understeer coefficient $K_U$ or vary $K_U$ as a function of vehicle speed to tune the system response as desired. The bank angle corrections (block 452, FIG. 6) are not required since the lateral accelerometer signal is directly input into the equation.

Figure 18:
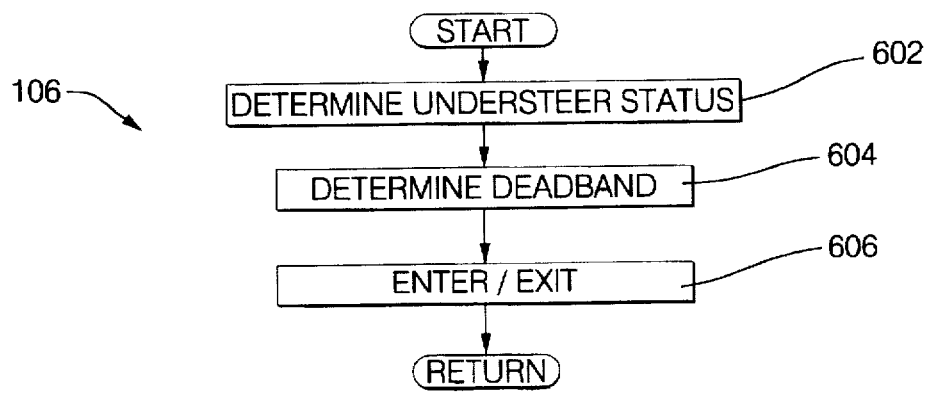
FIG. 18 illustrates an example flow control of block 106 of FIG. 2.

Referring now to FIG. 18, the main subroutine for performing the variable dead band function of block 106 of FIG. 2 and for determining whether or not the controller system is in the active brake control mode, is set forth.

The subroutine starts at block 602 where it performs the steps described with reference to FIGS. 19-20 for determining whether the vehicle is in understeer or oversteer mode. The subroutine at block 602 controls a flag, referred to as the understeer flag, so that it is set when the vehicle experiencing understeer and reset when the vehicle is experiencing oversteer.

Figure 22:
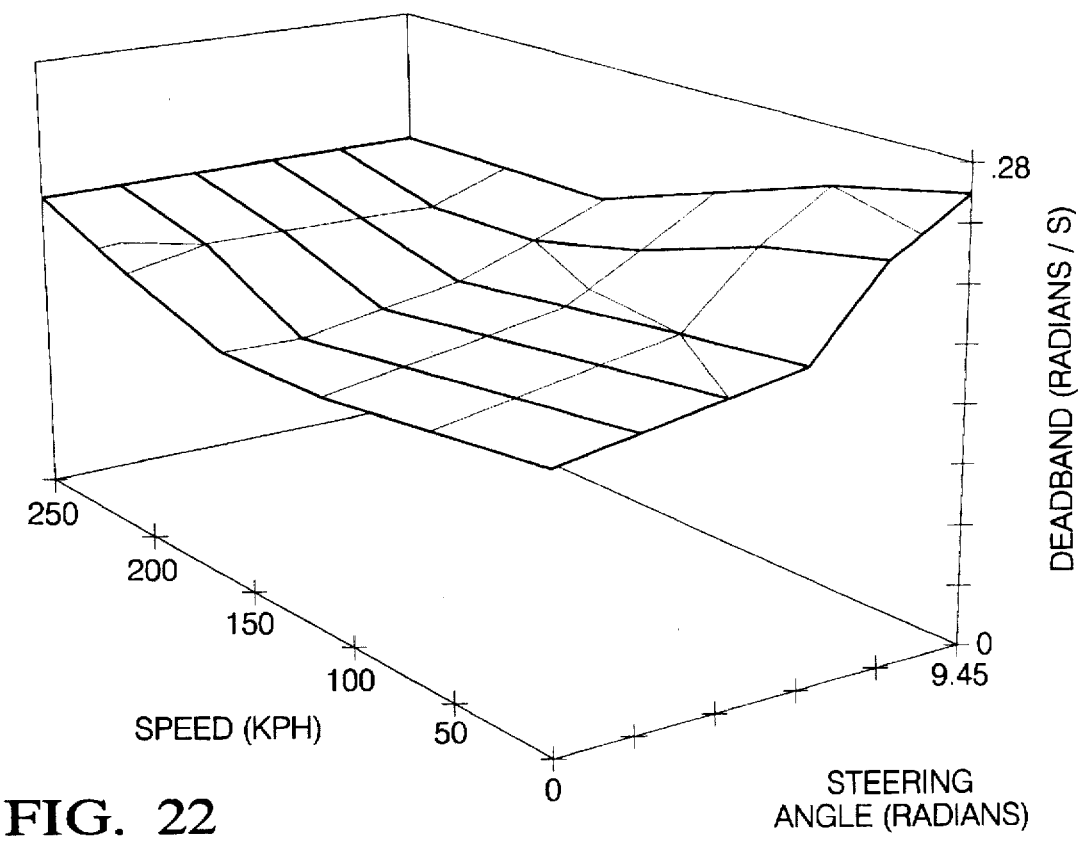
FIG. 22 illustrates an example plot of a look-up table function of block 652 of FIG. 21.
Figure 23:
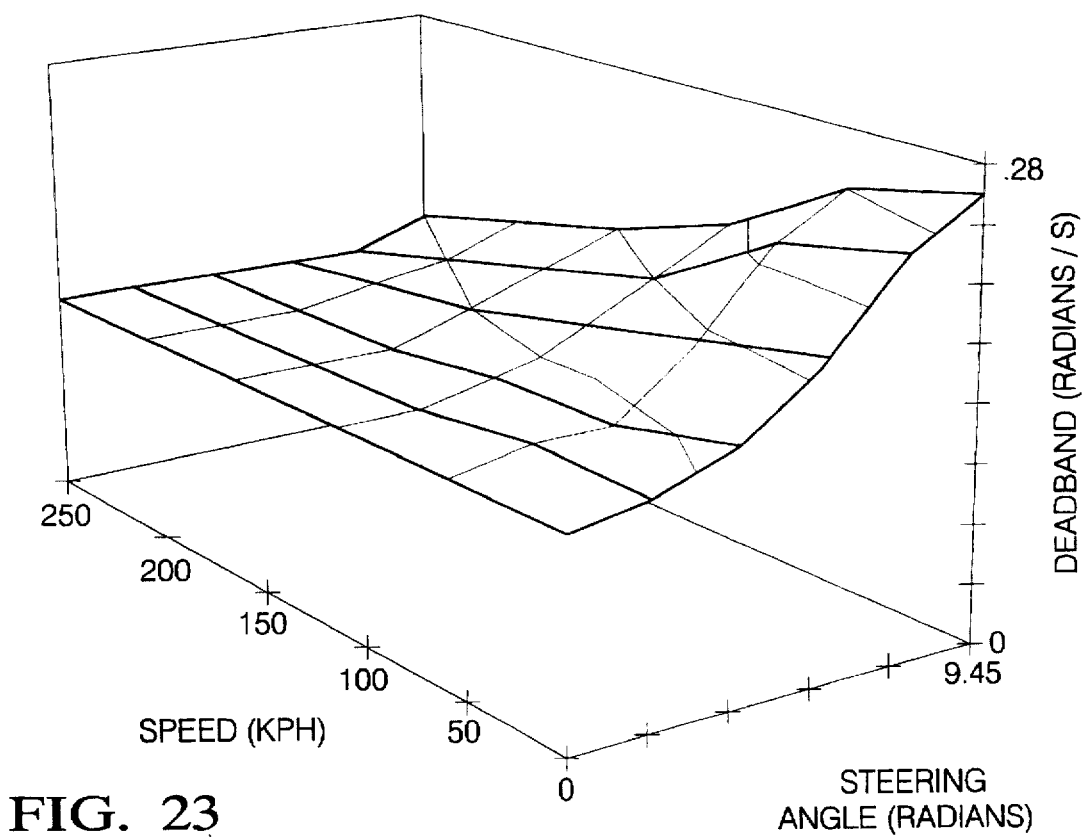
FIG. 23 illustrates an example plot of a look-up table function of block 654 of FIG. 21.

After block 602, the routine continues to block 604 where it performs a series of steps described below with reference to FIGS. 21-23 for determining the variable yaw rate error deadband. After the deadband is determined at block 604, the routine continues to block 606 where it performs a series of steps described below with reference to FIGS. 24-26 for determining activation and deactivation of the active brake control.

Figure 19:
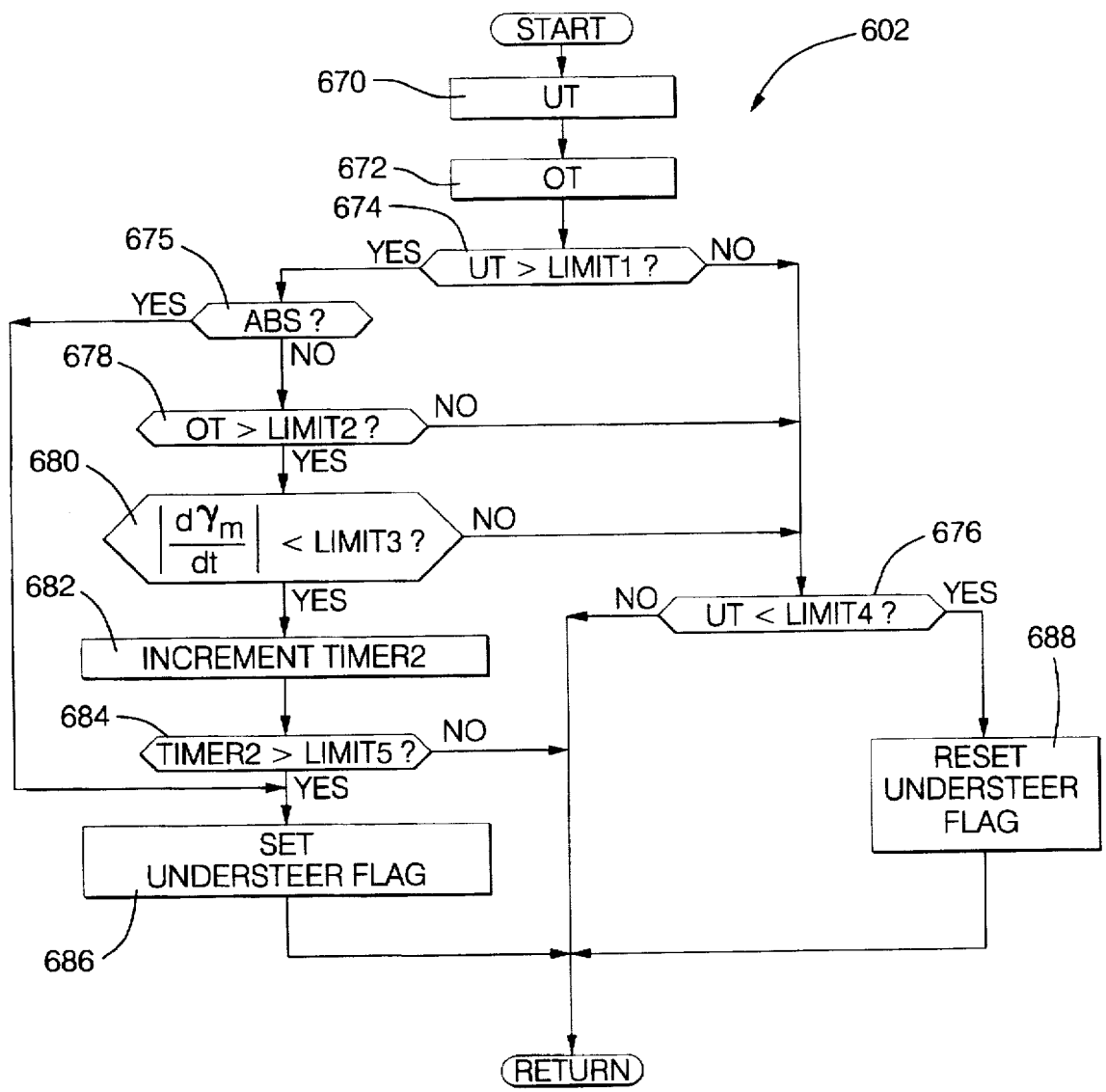
FIG. 19 illustrates an example flow control of block 602 of FIG. 18.
Figure 20:
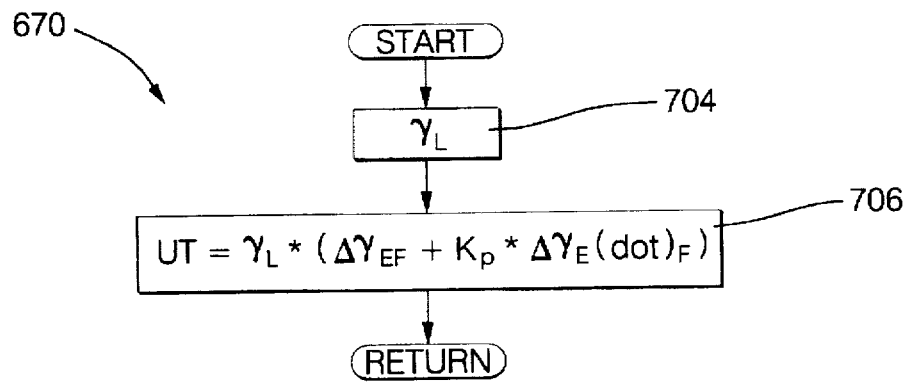
FIG. 20 illustrates an example flow control of block 670 of FIG. 19.

Referring now to FIG. 19, the subroutine for checking the under steer status begins at block 670 where it determines an under steer term using the subroutine shown with respect to FIG. 20.

Referring now to FIG. 20, block 704 determines the limited measured yaw rate, $\gamma_L$, equal to the measured yaw rate, $\gamma_M$, bounded to upper and lower limits, for example $+/-2.5$ degrees/s. Bounding $\gamma_M$ in this manner filters out sensor noise which may effect the understeer term (block 706) at low speed high yaw rate maneuvers. Block 706 then determines the understeer term, UT, according to:

$$UT = \gamma_L * (\Delta\gamma_{EF} + K_P * \Delta\gamma_E(dot)_F),$$

where $K_P$ is a predetermined constant, for example 0.03 s, and $\Delta\gamma_{EF}$ and $\Delta\gamma_E(dot)_F$ are determined as described below with reference to FIG. 26. After block 706, the subroutine 670 is completed.

Referring again to FIG. 19, from block 670 the routine continues to block 672 where it determines the over steer term, OT, by multiplying the measured yaw rate, $\gamma_M$, by the measured lateral acceleration, $A_M$. From block 672 the routine continues to block 674 where UT is compared to first predetermined value, LIMIT1, for example, $-4$ (degrees/s)$^2$. If the understeer term is not greater than LIMIT1, then the routine continues to block 676 where it compares UT to a value LIMIT4, for example, $-6$ (degrees/s)$^2$. If UT is not less than LIMIT4, then the subroutine 602 is exited.

If UT is less than LIMIT4, then the routine continues to block 688 where it resets the understeer flag, indicating that the vehicle is now in oversteer condition, and the subroutine 602 is exited. If at block 674 UT is greater than LIMIT1, the routine continues to block 675 where it checks the ABS flag. If the ABS flag is set, the routine continues to block 686 where it sets the understeer flag.

Otherwise the routine continues to block 678 where it compares OT to a predetermined value, LIMIT2, for example $-1$ degrees*g/s. If OT is not greater than LIMIT2, then the routine continues to block 676. Otherwise, the routine continues to block 680 where it compares the absolute value of measured yaw acceleration, $d\gamma_M/dt = (\gamma_M(n) - \gamma_M(n-1))/0.01$, to a predetermined value, LIMIT3, for example 200 degrees/s$^2$. If the absolute value of yaw acceleration is not less than LIMIT3, then the routine continues to block 676. Otherwise the routine continues to block 682 where it increments the understeer timer, TIMER2.

From block 682 the routine continues to block 684 where TIMER2 is compared to a predetermined value LIMIT5, for example 0.25 s. If TIMER2 is not greater than LIMIT5, then the routine exits. Otherwise, the routine continues to block 686 where it sets the understeer flag and then exits.

Figure 21:
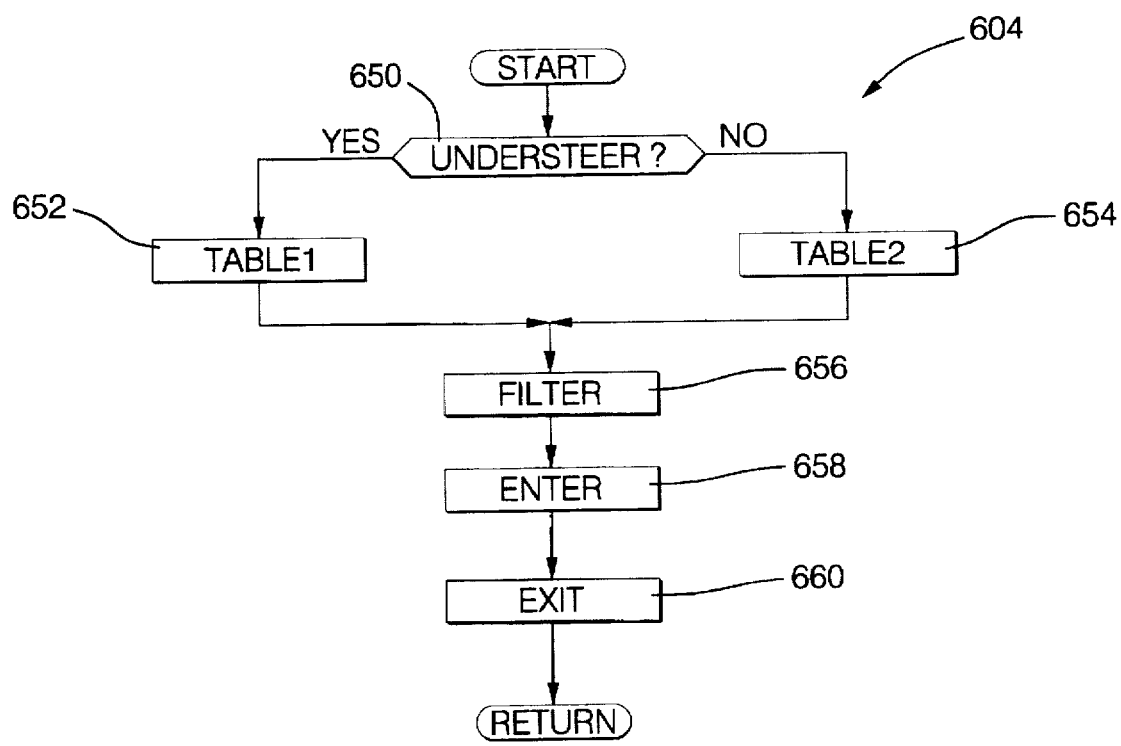
FIG. 21 illustrates an example flow control of block 604 of FIG. 18.

Referring now to FIG. 21, the subroutine for determining the variable dead band starts at block 650 where it checks the understeer flag. If the understeer flag is set, the routine continues to block 652, otherwise the routine continues to block 654.

Blocks 652 and 654 represent two look-up table functions for looking up a dead band value, DB, responsive to steering wheel angle and vehicle speed. Table 652 is used when the vehicle is in understeer mode and table 654 is used the vehicle is in oversteer mode. The use of two different tables allows independent dead band adjustment for understeer and oversteer conditions of the vehicle. For example, typically a larger dead band will be allowed for understeer conditions than will be allowed for oversteer conditions. Example graphs of the understeer and oversteer table functions are illustrated in FIGS. 22 and 23.

From blocks 652, 654, the routine continues to block 656 where DB is filtered to determine $DB_F$ using a first order lag filter of the type described above with reference to block 700 (FIG. 20), in which an example gain A is set to 0.4. Then at block 658 the entrance yaw rate, ENTER, is set equal to $DB_F$ and at block 660 the exit yaw rate, EXIT, is set equal to $DB_F$ minus DEAD0, where DEAD0 is a hysteresis term set, for example, to 0.07 radians/s (4 degrees/s). After block 660 the subroutine in FIG. 21 is completed.

Figure 24:
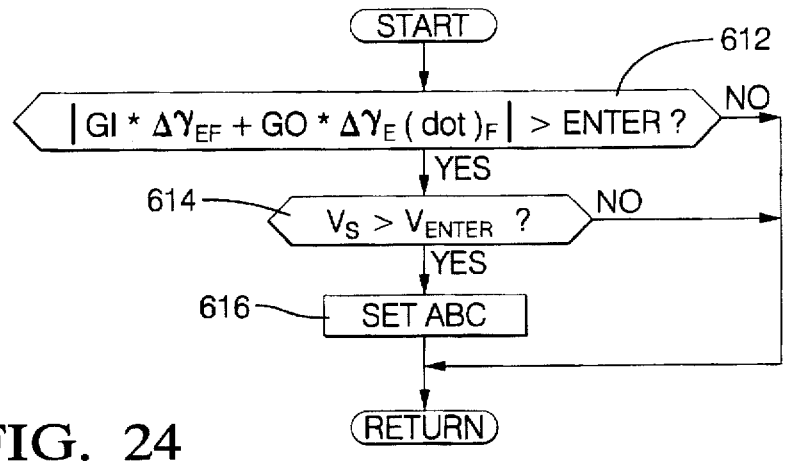
FIG. 24 illustrates an example flow control for activating active brake control.

Referring now to FIG. 24, block 612 performs the following comparison:

|G1*$\Delta\gamma_{EF}$+G0*$\Delta\gamma_E$(dot)$_F$|>ENTER, where G1 and G0 are determined as described below. If the test is false, then the routine in FIG. 24 is completed and continues to FIG. 25. If the test at block 612 is true, the routine continues to block 614 where $V_S$ is compared to a threshold $V_{ENTER}$, which is set, for example, to 16 kph. If the vehicle speed is not above $V_{ENTER}$, the routine continues to block 618 in FIG. 25, otherwise the routine continues to block 616 where it sets the ABC flag, indicating that active brake control is active.

Figure 25:
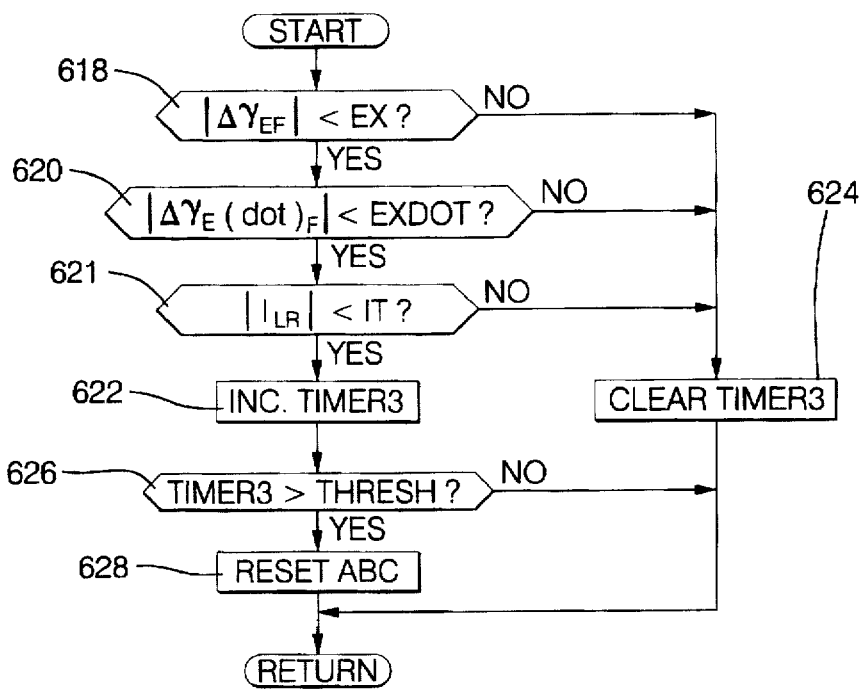
FIG. 25 illustrates an example flow control for deactivating active brake control.
Figure 26:
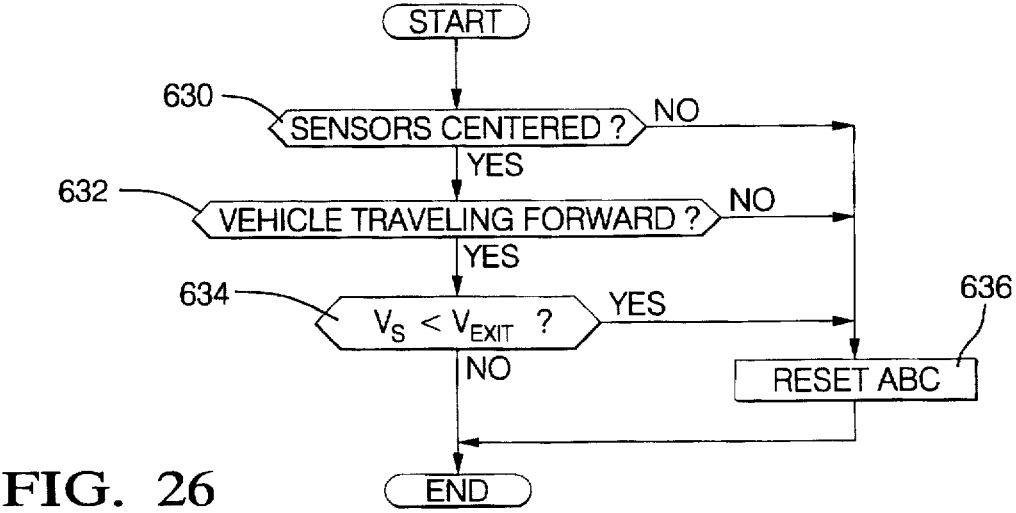
FIG. 26 illustrates example additional flow control for deactivating active brake control.

The routine then continues to FIGS. 25 and 26 to determine whether the active brake control should be exited. In FIG. 25, block 618 compares |$\Delta\gamma_{EF}$| to EX, which is the sum of EXIT and EXOFF, where EXOFF is an offset value set according to Table 3 below. If |$\Delta\gamma_{EF}$| is not less than EX, then the routine continues to block 624 where the exit timer, TIMER3, is cleared. From block 624 the routine in FIG. 25 is exited. If |$\Delta\gamma_{EF}$| is less than EX at block 620, |$\Delta\gamma_E$ (dot)$_F$| is compared to EXDOT, which is determined as described below. If |$\Delta\gamma_E$ (dot)$_F$| is not greater than EXDOT, the routine continues to block 624, otherwise the routine continues to block 621. At block 621, |$I_{LR}$| is compared to a predetermined threshold. $I_{LR}$ is determined as described below with reference to FIG. 28. The threshold is set to correspond to an $I_{LR}$ value indicating high differential brake pressure may be applied to a wheel, in which case it is not desirable to exit. If |$I_{LR}$| is above the threshold, the routine continues to block 624, otherwise the routine continues to block 622 where TIMER3 is incremented.

Then block 626 compares TIMER3 to its threshold value, for example 0.25 s. IF TIMER3 is greater than its threshold value, the ABC flag is reset at block 628, otherwise the routine in FIG. 25 is exited.

Next block 630 determines whether the steering wheel sensor has been centered as described in copending patent application, Ser. No. 08/664,321. If not, the routine continues to block 636 where the ABC flag is reset. Otherwise the routine continues to block 632 where it checks to determine whether the vehicle is traveling forward, if not, the routine continues to block 636, otherwise the routine continues to block 634 where it compares the vehicle speed to an exit threshold, for example, 6 kph. If the vehicle speed is less than the exit threshold, the routine continues to block 636, otherwise the routine in FIG. 26 is exited.

Example values for EXOFF, EXDOT, the exit timer threshold (EXTIME) and G0 and G1 described above are set forth by the following tables responsive to a high brake pressure flag, the ABS active flag and the understeer flag. The high brake pressure flag, HBP, is set if the master cylinder has a pressure sensor and its output rises above a calibrated value, for example, 600 psi, or if the brake pedal is provided with an extended travel sensor that outputs a signal when the pedal is depressed to a degree indicating that the operator desires hard braking.

TABLE 3

| HBP | ABS | Understeer | EXOFF (deg/s) | EXDOT (deg/s²) | EXTIME (s) |
|---|---|---|---|---|---|
| * | SET | SET | 63.25 | 127 | 0.05 |
| * | SET | RESET | 20 | 50 | 0.05 |
| SET | RESET | * | 10 | 40 | 0.05 |
| RESET | RESET | * | 0 | 25 | 0.25 |

TABLE 4

| HBP | ABS | UNDERSTEER | G1 | G0 |
|---|---|---|---|---|
| * | SET | SET | 0 | 0 |
| * | SET | RESET | 0 | 0.25 |
| SET | RESET | * | 0.5 | 0 |
| RESET | RESET | * | 1 | 0.15 |

Figure 27:
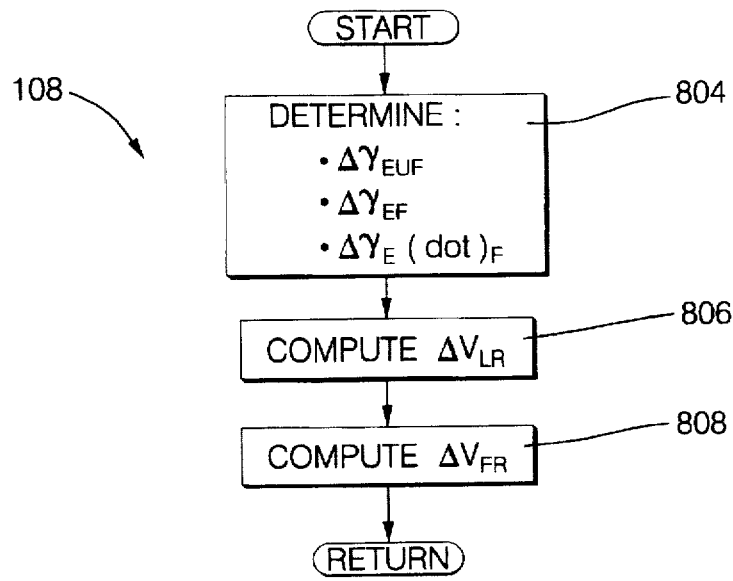
FIG. 27 illustrates an example flow control for block 108 of FIG. 2.

Referring now to FIG. 27, the main subroutine for performing the functions of the closed loop command determination block 108 (FIG. 2) is shown. The main subroutine starts at block 804 where it performs a subroutine, described below with reference to FIG. 28, for adjusting $\Delta\gamma_{EF}$, $\Delta\gamma_{EUF}$ and $\Delta\gamma_E$(dot)$_F$.

Then block 806 performs the subroutine described below with reference to FIGS. 29 and 30 to compute the closed loop command $\Delta V_{LR}$ and block 808 performs the subroutine described below with reference to FIG. 31 to compute the closed loop command $\Delta V_{FR}$. $\Delta V_{LR}$ is the left to right wheel speed difference used to provide left-right vehicle control using closed loop wheel speed control described further below and $\Delta V_{FR}$ is the command that provides the front to rear control and is also applied by using the closed loop wheel control described below.

Figure 28:
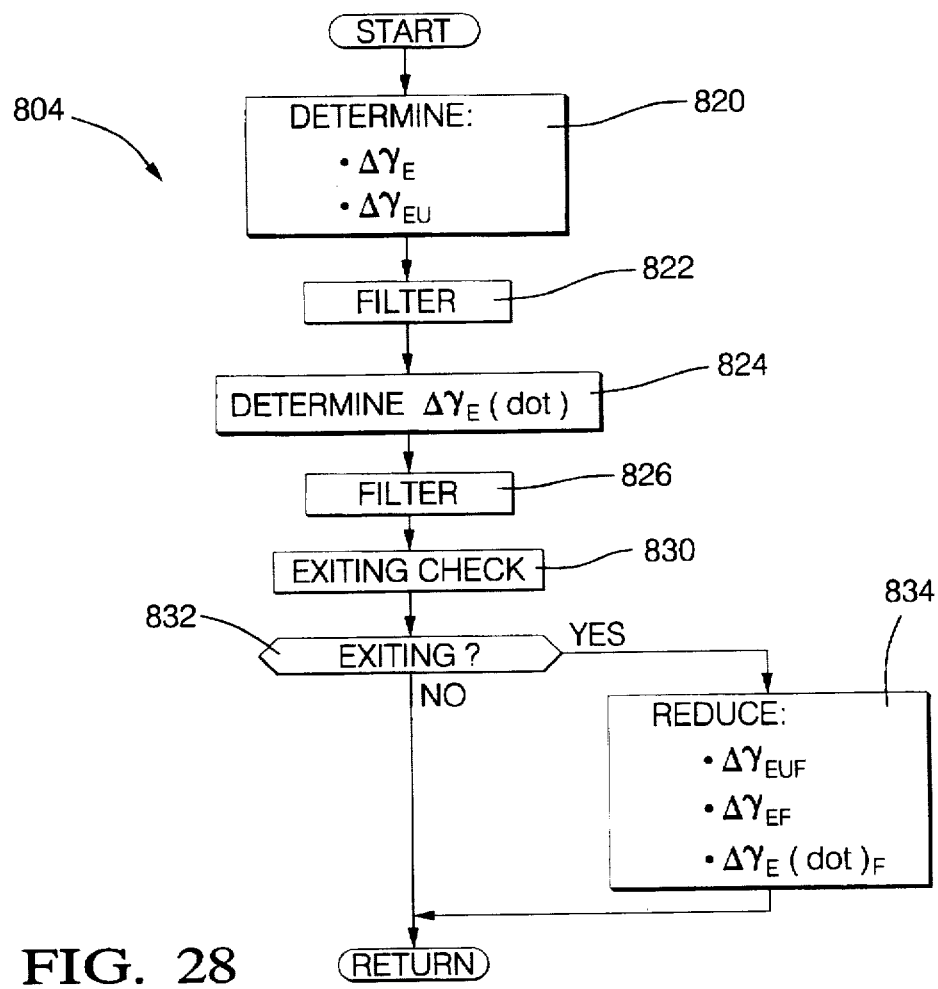
FIG. 28 illustrates an example flow control for block 804 of FIG. 27.

Referring now to FIG. 28, the subroutine performed at block 804 in FIG. 27 begins at block 820 where $\Delta\gamma_E$ and $\Delta\gamma_{EU}$ are computed as follows:

$$\Delta\gamma_E = \gamma_{DOF} - \gamma_M,$$

and $$\Delta\gamma_{EU} = \gamma_{DUF} - \gamma_M.$$

Then at block 822, $\Delta\gamma_E$ and $\Delta\gamma_{EU}$ are filtered using a digital first order lag filter, for example, according to the equation:

y(n)=A*x(n)+(1-A)*y(n-1), where x(n) is the filter input, y(n) is the filter output and A is the filter gain set, for example, at 0.363 (assuming a loop time of 0.01 s). The results of the filtering at block 822 are $\Delta\gamma_{EF}$ and $\Delta\gamma_{EUF}$.

Block 824 computes the differentiated oversteer yaw rate error $\Delta\gamma_E$ (dot) equal to ($\Delta\gamma_E$ (n)–$\Delta\gamma_E$ (n–1))/0.01 and block 826 filters $\Delta\gamma_E$ (dot) using a single pole lag filter to get $\Delta\gamma_E$ (dot)$_F$.

Block 830 checks a diagnostic flag that is set when system diagnostics has indicated an error in the closed loop yaw control system or when a spin condition of the vehicle is detected. An example diagnostic control suitable for use with this system is set forth in pending patent application U.S. Ser. No. 08/683,881, assigned to assignee of this invention. An example spin detection routine is set forth in pending U.S. patent application, Ser. No., 08/660,150, assigned to the assignee of this invention. If the flag is set, then block 832 sends the routine to block 834 where $\Delta\gamma_{EUF}$, $\Delta\gamma_{EF}$ and $\Delta\gamma_E$ (dot)$_F$ are reduced with each loop through the subroutine to force the active brake control off. The terms are reduced, for example, by multiplying each by a gain term with each loop through the subroutine. The gain term is less than one and progressively decreases with each loop so that after a predetermined number of loops the gain term is zero and $\Delta\gamma_{EUF}$, $\Delta\gamma_{EF}$ and $\Delta\gamma_E$ (dot)$_F$ are forced to zero. Gradually reducing the control terms in this manners allows exiting from the system control without imparting a sudden change of yaw torque on the vehicle. Otherwise, if no diagnostic failure is observed, the subroutine 804 is terminated.

Figure 29:
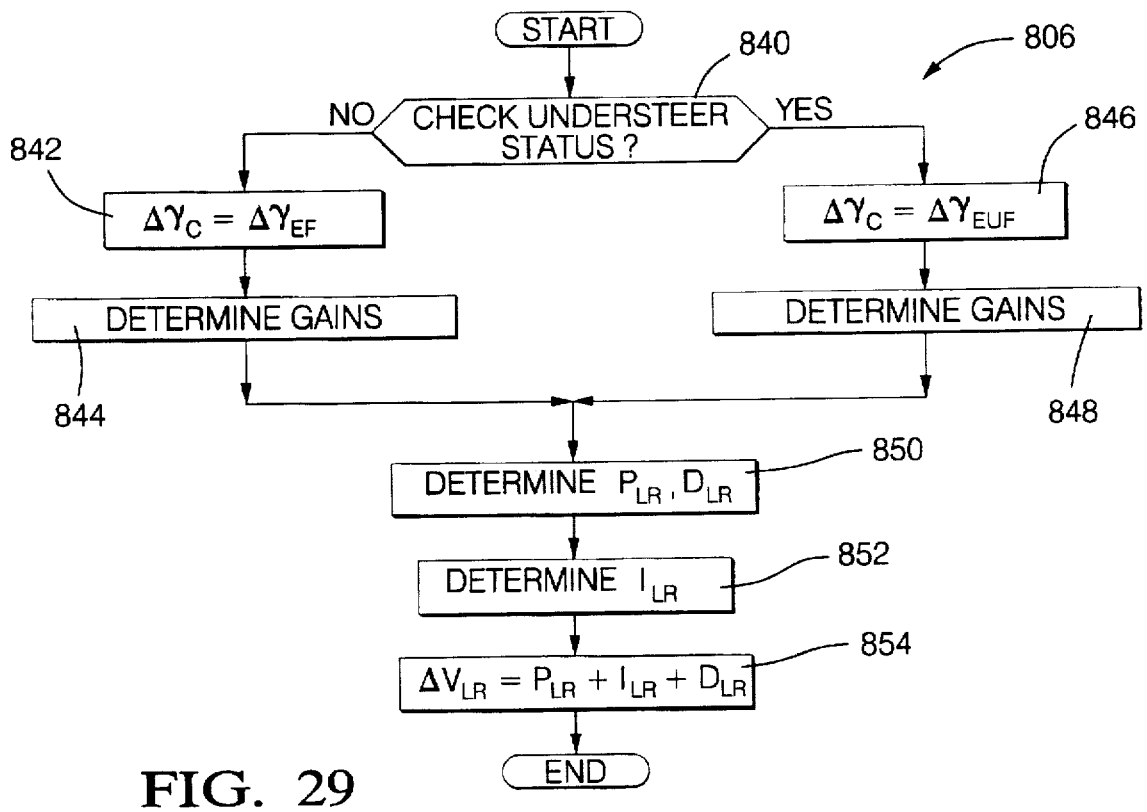
FIG. 29 illustrates an example flow control for block 806 of FIG. 27.

Referring now to FIG. 29, the subroutine performed by block 806 for computing the closed loop left to right wheel speed difference $\Delta V_{LR}$ begins at block 840 where it checks whether the understeer flag is set. If the understeer flag is set, the routine continues to block 846 where it sets the closed loop yaw rate error $\Delta\gamma_C$ equal to $\Delta\gamma_{EUF}$.

Then at block 848 the routines retrieves a set of PID gains $K_P$, $K_I$ and $K_D$ for control of the vehicle in the understeer state. The proportional and derivative gains are determined from look-up tables as a function of vehicle speed and the integral gain is set, for example, at 0.03. Example look-up table functions for the proportional and derivative gains are illustrated in table 6 below.

If at block 840 the understeer flag is not set, then it is assumed that the vehicle in an oversteer condition and the routine continues to block 842 where it sets the closed loop yaw rate error $\Delta\gamma_C$ equal to $\Delta\gamma_{EF}$.

At block 844 the proportional and derivative gains $K_P$ and $K_D$ are determined from another set of look-up tables for the oversteer condition responsive to vehicle speed. The integral gain $K_I$ is set, for example, equal to 0.03. Example functions of the look-up tables of blocks 844 and 848 are as follows.

TABLE 5

| | (oversteer) | |
|---|---|---|
| $V_s$ (km/hr) | $K_P$ | $K_D$ |
| 0 | 0.6417 | 0.1128 |
| 80 | 0.6667 | 0.1333 |
| 160 | 0.6917 | 0.1503 |
| 240 | 0.7167 | 0.1753 |

TABLE 6

| | (understeer) | |
|---|---|---|
| $V_s$ (km/hr) | $K_P$ | $K_D$ |
| 0 | 0.225 | 0.0625 |
| 80 | 0.25 | 0.083 |
| 160 | 0.275 | 0.1 |
| 240 | 0.3 | 0.125 |

From block 844 or 848, the routine continues to block 850 where it determines the left to right command proportional and derivative components, $P_{LR}$ and $D_{LR}$, according to $P_{LR}=K_P*\Delta\gamma_C$ and $D_{LR}=K_D*\Delta\gamma_E$ (dot). Then from block 850 the routine continues to block 852 where it performs the subroutine illustrated in FIG. 30 for determining the integral portion of $\Delta V_{LR}$.

Figure 30:
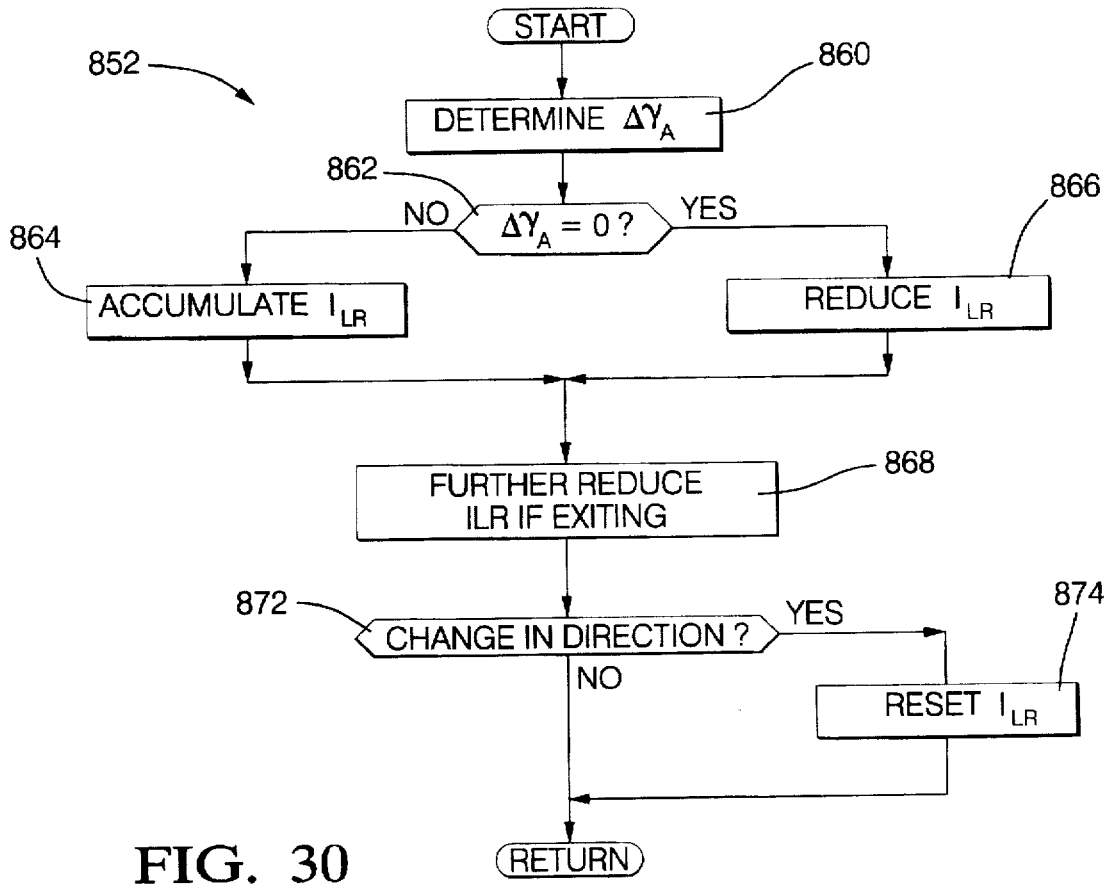
FIG. 30 illustrates an example flow control for block 852 of FIG. 29.

Referring to FIG. 30, the routine determines at block 860 an adjusted yaw rate error, $\Delta\gamma_A$, as follows. If $\Delta\gamma_{EF}$ is positive and larger than $DB_F$, the over steer dead band determined at block 108 (FIG. 2), then $\Delta\gamma_A=\Delta\gamma_{EF}-DB_F$. If $\Delta\gamma_{EF}$ is negative and smaller than negative $DB_F$, then $\Delta\gamma_A=\Delta\gamma_{EF}+DB_F$ or if $\Delta\gamma_{EF}$ is between the positive and negative variable dead bands, then $\Delta\gamma_A$ is set to zero.

The routine from block 860 continues to block 862 where it compares the value $\Delta\gamma_A$ to zero. If $\Delta\gamma_A$ is equal to zero, then at block 866 the integral term $I_{LR}$ is reduced by a predetermined decay value, for example 0.4 degrees/s, until $I_{LR}$ reaches zero. If $\Delta\gamma_A$ is not equal to zero at block 862, then at block 864 the accumulated value for $I_{LR}$ is updated according to $I_{LR}=I_{LR}+K_I*\Delta\gamma_A$. From block 864 or 866, the routine continues to 868 where, if the exiting flag is set (block 830, FIG. 28), $I_{LR}$ is further reduced by multiplying it by a gain between zero and one. Block 868 provides for gradual termination of the control represented by the integral portion of the command $I_{LR}$.

Block 872 determines whether or not a change in steering wheel direction has been made by comparing the sign of $\gamma_D$ with the sign of $\Delta\gamma_{EF}$. If the signs are different, then the routine moves to block 874 where the term $I_{LR}$ is reset to zero. Otherwise, from block 872 the subroutine is ended and similarly from block 874 the subroutine is ended.

Referring again to FIG. 29, once the subroutine at block 852 is completed, the routine continues to block 854 where it determines the closed loop left to right command as $\Delta V_{LR}=P_{LR}+I_{LR}+D_{LR}$. The subroutine 806 is then completed.

In the above example, $P_{LR}$, $I_{LR}$ and $D_{LR}$ are determined using gains that vary as a function of vehicle speed. In an alternative example, $P_{LR}$, $I_{LR}$ and $D_{LR}$ can be determined directly from look-up tables responsive to $\Delta\gamma_C$, $\Delta\gamma_A$ and $\Delta\gamma_E$ (dot)$_F$, respectively. This alternative approach allows the terms to vary nonlinearly with yaw rate error and its derivative.

Figure 31:
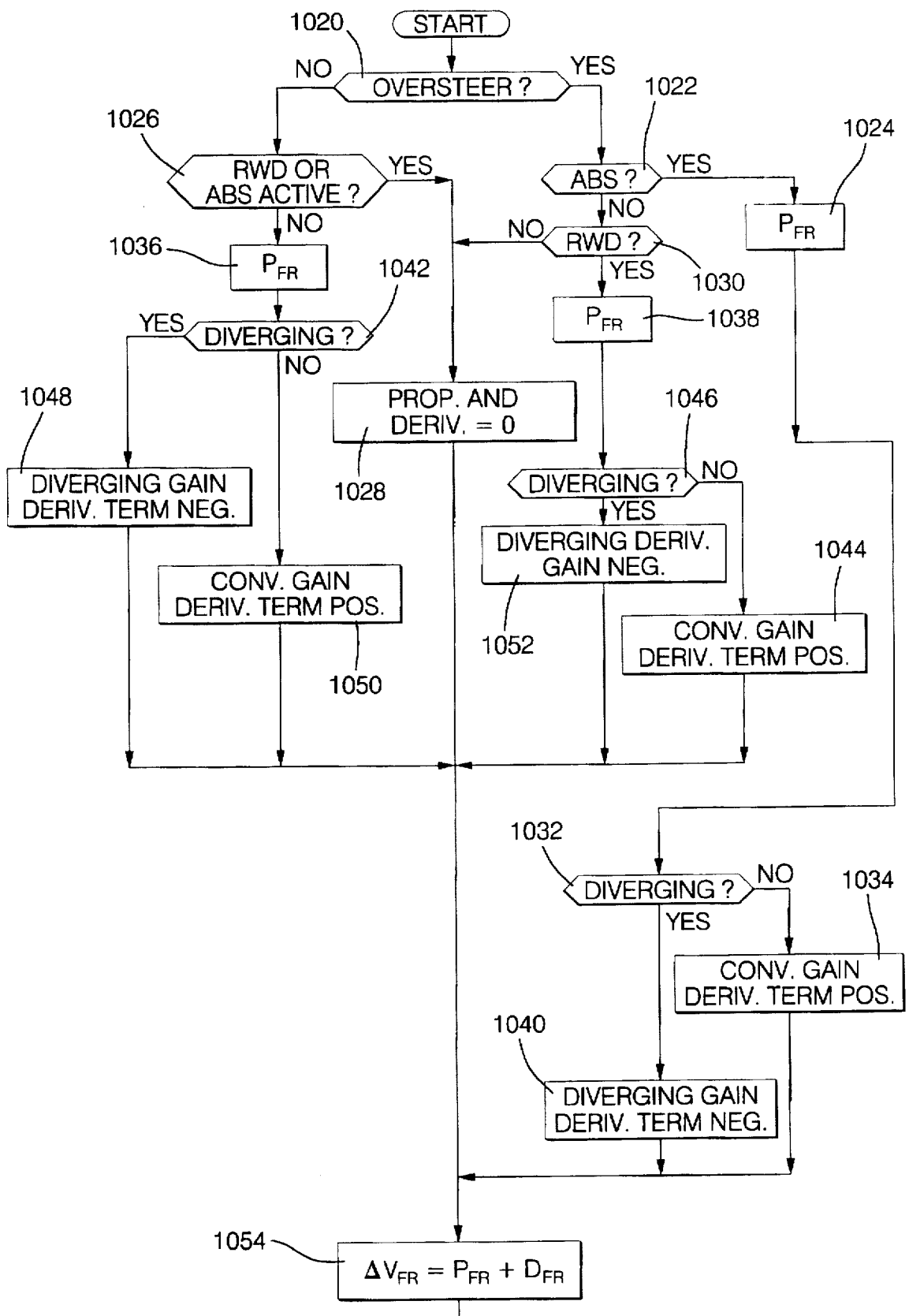
FIG. 31 illustrates an example flow control for block 808 of FIG. 27.

Referring now to FIG. 31, the routine for determining $\Delta V_{FR}$ checks the understeer flag at block 1020. If the understeer flag is not set, the routine continues to block 1022 where it checks the ABS flag. If the ABS flag is set, indicating that ABS is active, the routine continues to block 1024 where it determines front to rear proportional term, $P_{FR}$, using an ABS gain, $K_{PABS}$, for example 0.083, where $P_{FR}=K_{PABS}*\Delta\gamma_{EF}$. At block 1024 the sign of $P_{FR}$ is set to negative.

From block 1024, the routine continues to block 1032 where it checks whether the yaw rate error is diverging, that is, getting larger. If not, the 30 routine continues to block 1034 where it determines the derivative term $D_{FR}$ according to $D_{FR}=K_{DABSC}*\Delta\gamma_E$ (dot)$_F$, where $K_{DABSC}$ is the anti-lock brake mode converging derivative gain set, for example, equal to 0. Block 1034 sets the sign of $D_{FR}$ positive.

If the yaw rate error is not diverging at block 1032, the routine continues to block 1040 where the diverging derivative term is determined using the anti-lock brake mode diverging derivative gain, $K_{DABSD}$, instead of $K_{DABSC}$. An example value for the diverging derivative gain $K_{DABSD}$ is 0.1. Block 1040 sets the sign of $D_{FR}$ negative.

From blocks 1034 or 1040, the routine continues to block 1054 where $\Delta V_{FR}$ is set equal to $P_{FR}$ plus $D_{FR}$. Bock 1054 limits $\Delta V_{FR}$ so that it is no greater than zero. After block 1054, the routine in FIG. 30 is exited.

If at block 1022, the ABS active flag was not set, the routine continues to block 1030 where it determines whether or not the vehicle is a rear wheel drive vehicle. If the vehicle is a rear wheel drive vehicle, the routine continues to block 1038 where it determines the proportional term $P_{FR}$ using the traction control proportional gain, $K_{PTCS}$, having an example value of 0.083, and sets the sign of $P_{FR}$ to negative.

The routine continues to block 1046 where it checks whether the yaw rate error is diverging, that is, getting larger. If not, the routine continues to block 1044 where it determines the derivative term $D_{FR}$ using $K_{DTCSC}$ as the traction control mode converging derivative gain set, for example, equal to 0. The sign of $D_{FR}$ is set to positive at block 1044.

If the yaw rate error is diverging at block 1046, the routine continues to block 1052 where the diverging derivative term is determined using the traction control mode diverging derivative gain, $K_{DTCSD}$, instead of $K_{DTCSC}$. The sign of the derivative term $D_{FR}$ is set negative at block 1052. An example value for the diverging derivative gain $K_{DTCSD}$ is 0.05.

From blocks 1044 or 1052, the routine continues to block 1054.

If at block 1030, the vehicle is not a rear wheel drive vehicle, then the routine moves to block 1028 where the proportional and derivative terms are set to zero and then to block 1054, where the resulting command, $\Delta V_{FR}$, will likewise equal zero.

If at block 1020, the understeer flag is set, the routine continues to block 1026, where it checks whether the vehicle is a rear wheel drive vehicle or if the ABS active flag is set. If either of these conditions is true, the routine continues to block 1028 where $P_{FR}$ and $D_{FR}$ are set to zero.

If at block 1026, the vehicle is not in ABS and the vehicle is front wheel drive, the routine continues to block 1036 where it determines $P_{FR}$ using the traction control mode proportional gain, $K_{PTCS}$, and sets the sign of $P_{FR}$ negative.

The routine continues to block 1042 where it checks whether the yaw rate error is diverging, that is, getting larger. If not, the routine continues to block 1050 where it determines the derivative term $D_{FR}$ using $K_{DTCSC}$. The sign of $D_{FR}$ is set to positive at block 1050.

If the yaw rate error is not diverging at block 1042, the routine continues to block 1048 where the diverging derivative term is determined using the traction control mode diverging derivative gain, $K_{DTCSD}$. The sign of the derivative term $D_{FR}$ is set negative at block 1048.

Figure 32:
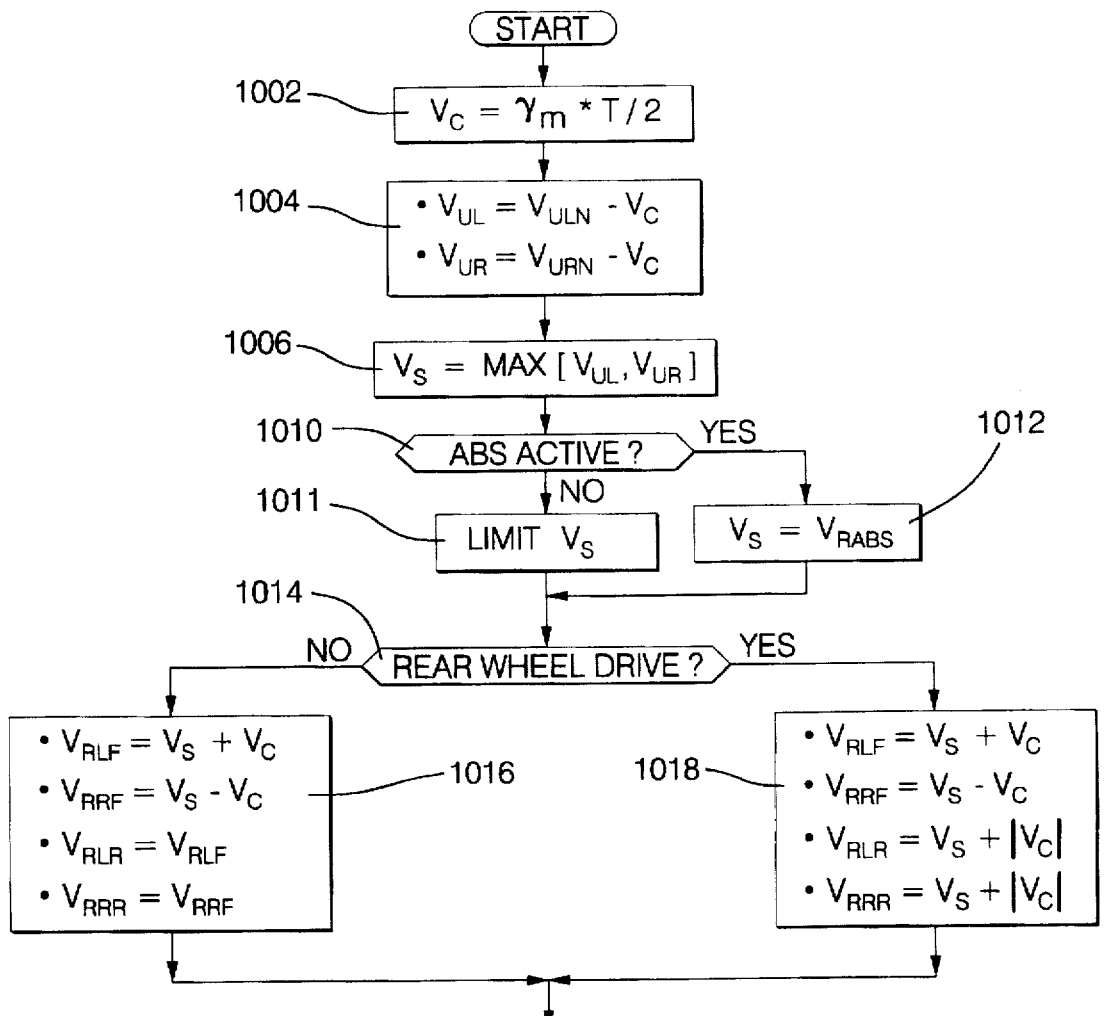
FIG. 32 illustrates an example flow control for determining vehicle velocity and four wheel reference velocities.

Referring now to FIG. 32, a subroutine for determining the vehicle velocity, $V_S$, and the four wheel reference velocities $V_{RLF}$, $V_{RRF}$, $V_{RLR}$ and $V_{RRR}$, for the left front, right front, left rear and right rear vehicle wheels, respectively, is shown. At block 1002, a vehicle speed compensation term $V_C$ is determined equal to $\gamma_M * T/2$, where T is the track width of the vehicle.

Next, block 1004 determines compensated speeds, $V_{UL}$ and $V_{UR}$, for the left and right undriven wheels, i.e., in a front wheel drive vehicle, the undriven wheels are the rear wheels. $V_{UL}$ and $V_{UR}$ are determined according to:

$$V_{UL} = V_{ULN} - V_C \text{ and}$$

$$V_{UR} = V_{URN} + V_C,$$

where $V_{ULN}$ and $V_{URN}$ are the normalized wheel speeds (typically available from the ABS controller) for the left and right undriven wheels, respectively.

Block 1006 then sets the vehicle reference speed, $V_S$, equal to the maximum of $V_{UL}$ and $V_{UR}$. At block 1010, if the ABS active flag is set, then the routine moves to block 1012 where $V_S$ is set to the vehicle reference velocity calculated in a known manner by the ABS controller. If the ABS active flag is not set at block 1010, block 1011 limits the present reference velocity, $V_S$, to no more than a predetermined difference from the previous reference velocity, $V_S$ (n−1).

Next at block 1014, the routine determines if the vehicle is a rear wheel drive vehicle. If so, the routine continues to block 1018 where it sets the reference velocities for the four vehicle wheels according to:

$$V_{RLF} = V_S + V_C,$$

$$V_{RRF} = V_S - V_C,$$

$$V_{RLR} = V_S + V_C, \text{ and}$$

$$V_{RRR} = V_S + V_C.$$

If the vehicle is not a rear wheel drive vehicle, then block 1016 determines the four wheel reference velocities according to:

$$V_{RLF} = V_S + V_C,$$

$$V_{RRF} = V_S - V_C,$$

$$V_{RLR} = V_{RLF}, \text{ and}$$

$$V_{RRR} = V_{RRF}.$$

After blocks 1016 or 1018 the subroutine in FIG. 32 is completed. The subroutine in FIG. 32 can be carried out at any point in the control, for example, after the sensor information is received or right before the force distribution subroutine described below is performed.

Figure 33:
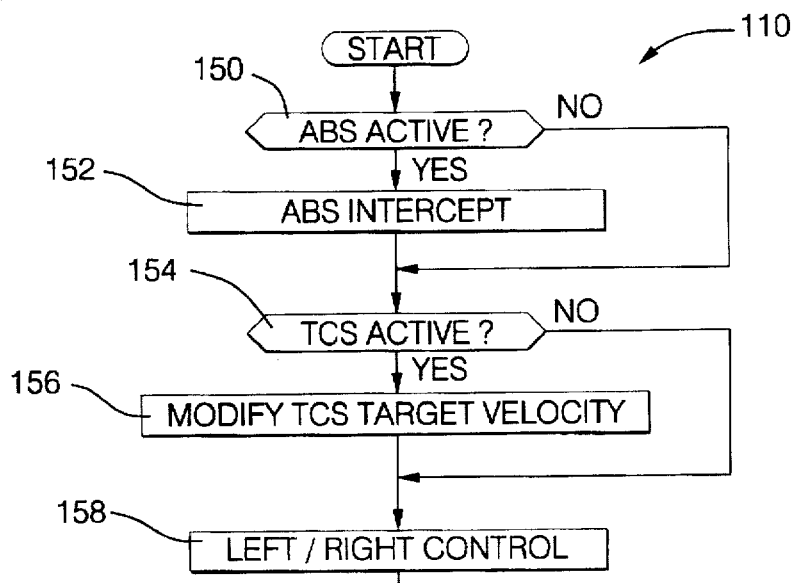
FIG. 33 illustrates an example flow control for block 110 of FIG. 2.

Referring now to FIG. 33, the main subroutine for the force distribution block 110 (FIG. 2) is shown. The routine starts at block 150 where it checks an ABS flag of a known type indicating whether or not anti-lock braking is active. If the anti-lock braking control is active, the routine moves to block 152 where it performs the ABS intercept described below with reference to FIG. 34. Otherwise the routine continues to block 154 where it checks another flag of a known type indicating whether or not positive acceleration traction control is active. If the traction control is active, the routine continues to block 156 where it performs the traction control intercept as follows.

In known positive acceleration traction control systems, the wheel slip of the drive wheels is targeted below a certain value that may either be fixed or vary with vehicle speed. This target value is referred to herein as the TCS target velocity. In rear wheel drive vehicles, the command $\Delta V_{FR}$ is added to the TCS target velocity. This has the effect of decreasing the TCS target velocity in oversteer conditions, which decreases allowable slip on the rear wheels, in turn increasing lateral holding force of the rear wheels to remove oversteer.

In front wheel drive vehicles, the command $\Delta V_{FR}$ is added to the TCS target velocity. When the vehicle is in understeer condition, this results in a lowering of the TCS target velocity, reducing wheel slip of the front wheels, which increases the lateral hold force of the front wheels to reduce the understeer. In all cases, the TCS target velocity is limited in a known manner to prevent engine power sags or stalling.

Next block 158 performs a subroutine described below with reference to FIG. 35 for achieving the left/right control responsive to $\Delta V_{LR}$.

Figure 34:
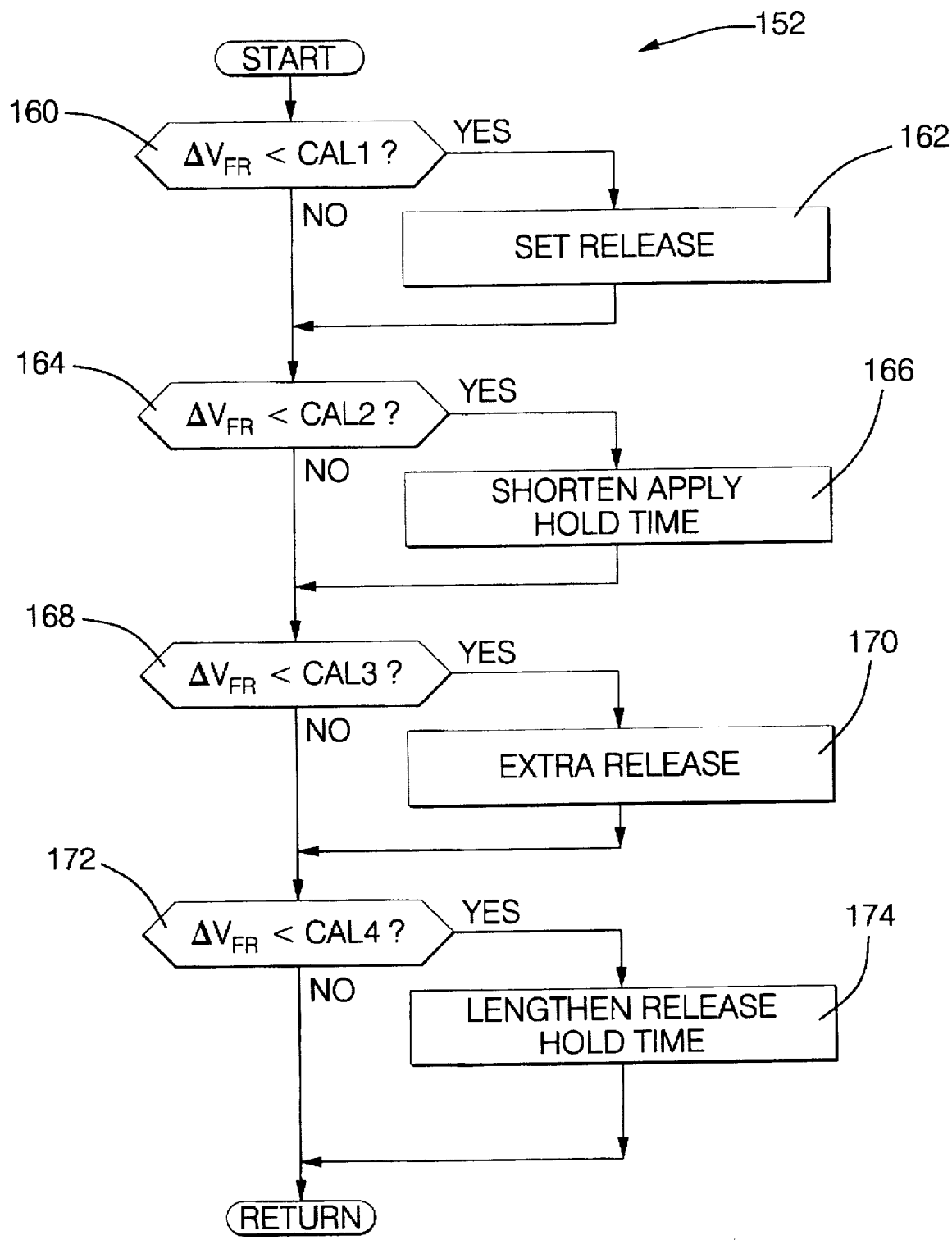
FIG. 34 illustrates an example flow control for block 152 of FIG. 33.

Referring now to FIG. 34, the ABS intercept routine is applied to rear wheels to reduce oversteer or to front wheels to reduce understeer. The following description is placed in the context of a known ABS control in which, during cycling of the brakes to prevent incipient wheel lock-up conditions, the brake pressure profile goes through four states: (1) release of pressure state, (2) hold in the release state, (3) apply pressure state, (4) hold in the apply state. Control of the individual wheel brakes into and out of ABS mode and through the four states is well known to those skilled in the art and will not be set forth in detail herein except as for the modifications described with reference to FIG. 34.

The routine starts at block 160 where it compares the $\Delta V_{FR}$ to a first predetermined value, CAL1, for example −12 kph. If $\Delta V_{FR}$ is less than CAL1, then the routine continues to block 162 where it sends the ABS control into an immediate release mode (state (1) described above) to decrease wheel slip and increase lateral holding forces of the wheel.

Next the routine continues to block 164, where $\Delta V_{FR}$ is compared to a second predetermined value, CAL2, for example −14 kph. If $\Delta V_{FR}$ is less than CAL2, the routine continues to block 166 where the ABS hold time during brake apply portions of the ABS cycle is reduced by about 10 to 30 milliseconds. This reduces the average brake pressure during the ABS cycle.

The routine then continues to block 168 where it compares $\Delta V_{FR}$ to another predetermined value, CAL3, for example −16 kph. If $\Delta V_{FR}$ is less than CAL3, the routine continues to block 170, where the release portion of the ABS cycle is modified to increase pressure release for one additional control loop. This has the effect of further reducing the average brake pressure during the ABS cycle.

The routine then continues to block 172 where $\Delta V_{FR}$ is compared to CAL4, for example, −20 kph. If $\Delta V_{FR}$ is less than CAL4, the routine continues to block 174 where the ABS cycle is modified by increasing the hold in release time before each apply by about 250 ms. This has the effect of further reducing the average brake pressure during the ABS cycle. After block 174 or block 172, the routine 152 is exited.

Figure 35:
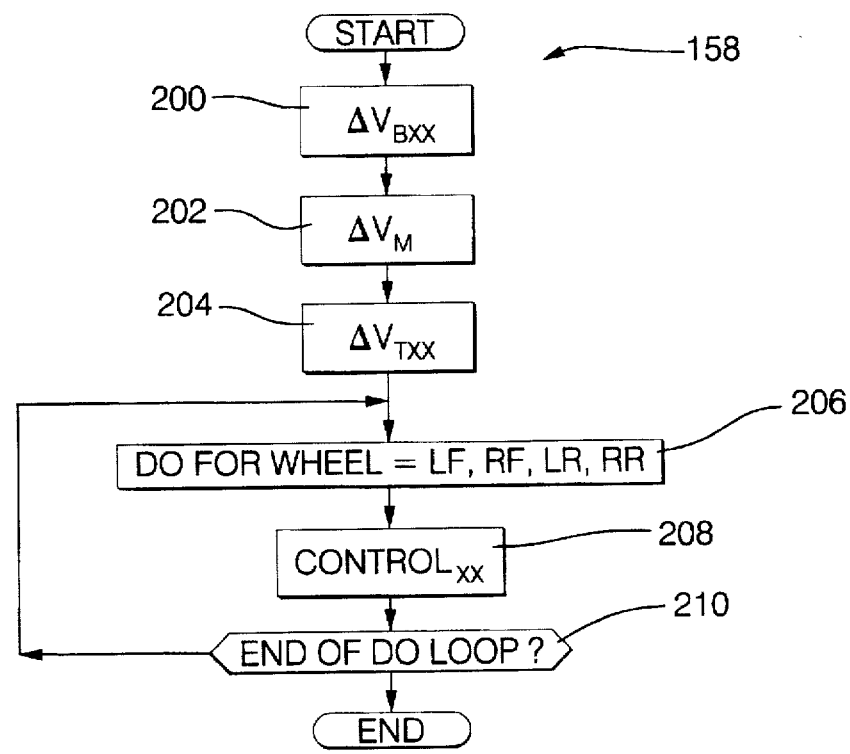
FIG. 35 illustrates an example flow control for block 158 of FIG. 33.

Referring to FIG. 35, the sign convention for the command $\Delta V_{FR}$ as used herein is as follows, $\Delta V_{LR}$ is negative when it is desired that $\Delta V_{LR}$ command a counterclockwise yaw moment and positive when it is desired that $\Delta V_{LR}$ command a clockwise yaw moment. The objective of the left-to-right control is to apply brake forces on particular wheels to alter the vehicle YAW moment in such a manner to reduce the oversteer or understeer of the vehicle. The particular wheels that are selected depend on the mechanization of the brake system. In general, by adding a brake force on one wheel a differential torque is developed across the axle, the magnitude of which is reflected by the speed difference between the left and right wheels on that axle.

The brake control described herein can be used with either a two or a four channel hydraulic brake system. A two channel system allows pressure to be selectively applied, independently of the driver, to each of the front wheels and allows pressure to be released independently on all four wheels. Any front wheel drive vehicle with positive acceleration traction control that utilizes the brake actuators has this capability in the actuators. In the two channel system, both understeer and oversteer are controlled by distributing the brake forces on the front axle. Oversteer is reduced by applying the brake force (and therefore a tire-to-road force) on the outside front wheel and, in some cases, releasing pressure on the inside front wheel causing a counter torque with respect to the center of rotation of the vehicle to offset the torque generated by the vehicle being in the oversteer condition. Understeer is reduced by applying a brake force on the inside front wheel and, in some cases, releasing pressure on the outside front wheel.

A four channel system has the same features as a two channel system but also allows brake pressure to be selectively applied to the rear wheels (or non-driven wheels) independent of the driver. In the four channel system, understeer is reduced by applying brake force to the inside rear wheel and, in some cases, releasing brake pressure on the outside rear wheel. To achieve full implementation of anti-lock braking, traction control and yaw rate control on a rear wheel drive vehicle, the four channel system having the features described herein must be implemented.

During anti-lock braking mode, differential axle torque is formed by releasing brake pressure on one wheel only in the oversteer condition. Understeer control is not performed by releasing brake pressures during ABS.

Figure 36:
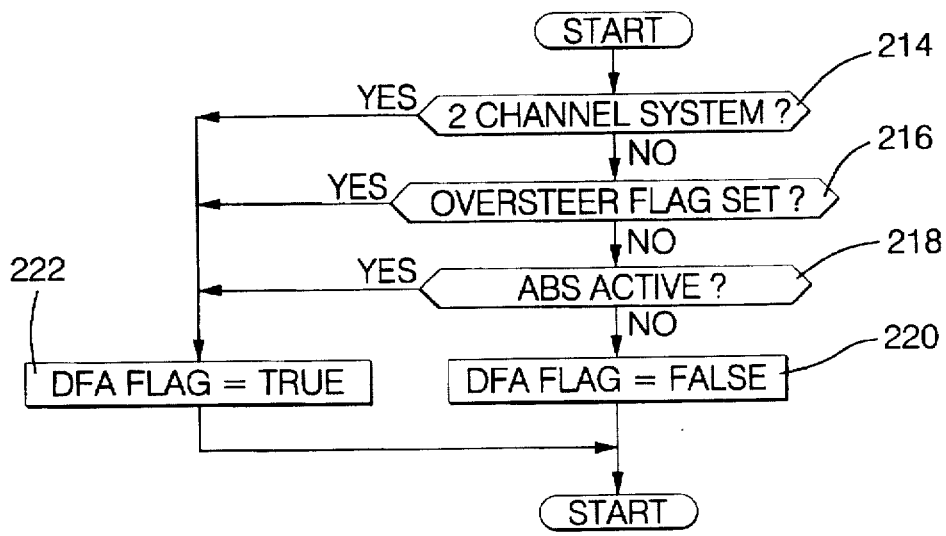
FIG. 36 illustrates an example flow control for configuring the example system to the vehicle.
Figure 37:
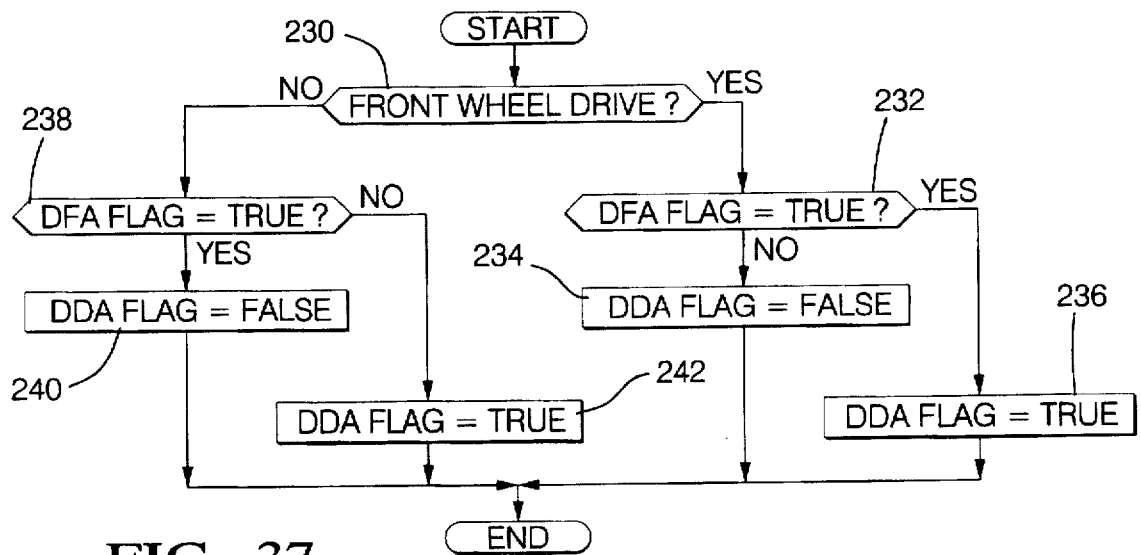
FIG. 37 illustrates another example flow control for configuring the example system to the vehicle.

Referring to FIG. 35, when the routine starts, it first performs the subroutines shown in FIGS. 36 and 37, which configure the system to either the two channel or four channel hardware, as is implemented in the vehicle being controlled.

Referring to FIGS. 36 and 37, two flags are set depending on whether or not the system is a two channel system, whether or not the system is in oversteer mode, whether or not ABS is active and whether or not the vehicle is a front wheel drive vehicle. The control provided by blocks 214–242 sets the ABC desired front axle (DFA) flag equal to true if the hardware is a two channel system, if the vehicle is experiencing oversteer, or if the ABS is active. Otherwise the DFA flag is set to false. The ABC desired driven axle (DDA) flag is set to true if the vehicle is a front wheel drive vehicle and the DFA flag is set to true. If the vehicle is not a front wheel drive vehicle, the DDA flag is set to true if the DFA flag is set to false. In all other conditions, the DDA flag is set to false.

The routines performed in FIGS. 36 and 37 ensure that the front axle is the primary control axle in all cases except in understeer conditions in a four channel system when the anti-lock brake flag is not set.

Referring again to FIG. 35, after the preliminary routines in FIGS. 36 and 37 are performed, the subroutine represented by block 200 is performed. Block 200 uses the command $\Delta V_{LR}$, the traction control information and the ABS information along with the flags set at FIGS. 36 and 37 to determine which wheels to control and calculates a base delta velocity for each wheel to be controlled. The base delta velocity represents wheel slip already occurring when active control is initiated on the wheel. The subroutine performed at block 200 is shown with respect to FIGS. 38A–C.

Figure 38A:
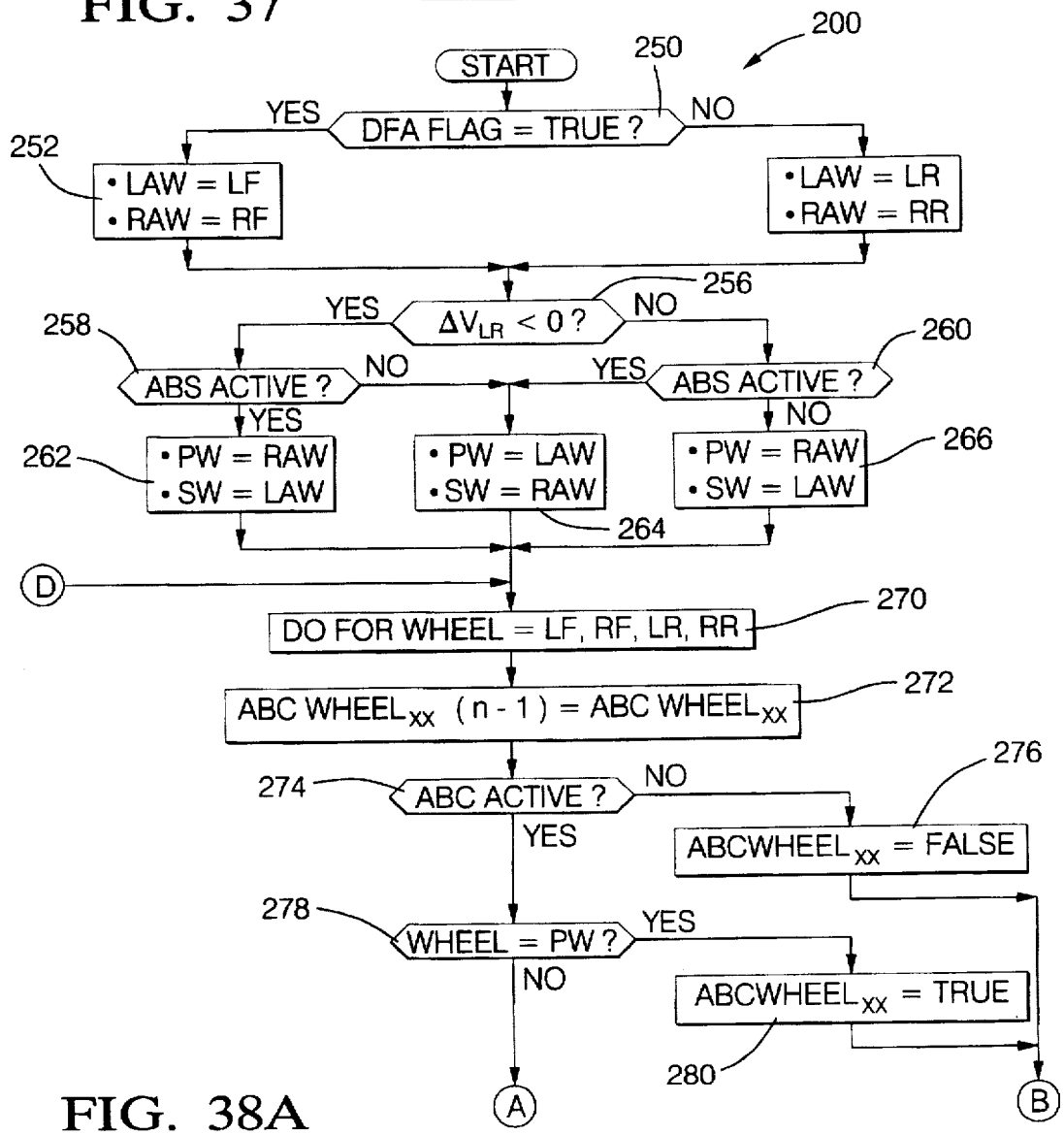
FIG. 38A illustrates an example flow control for block 200 of FIG. 35.
Figure 38B:
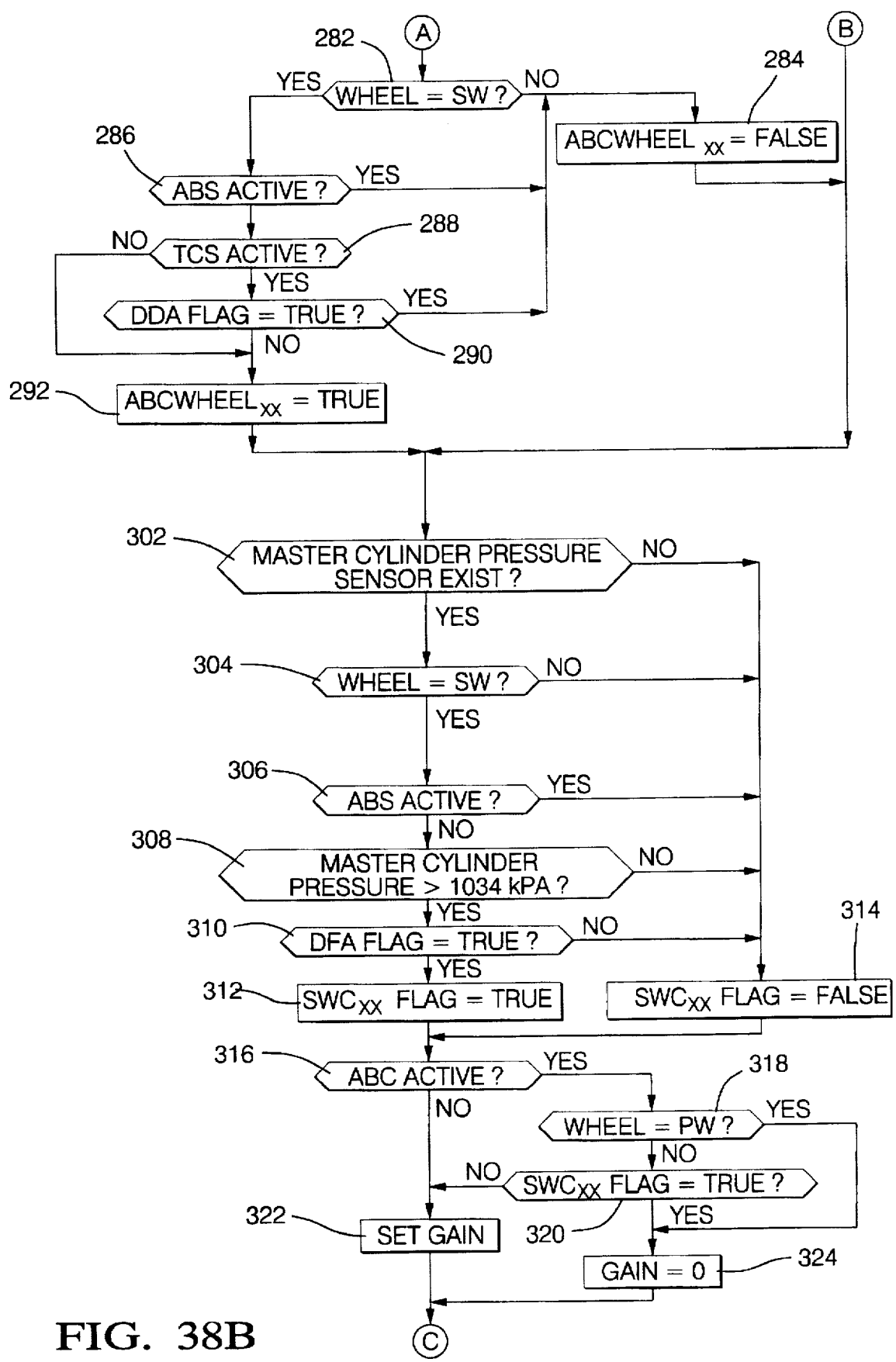
FIG. 38B illustrates additional example flow control for block 200 of FIG. 35.
Figure 38C:
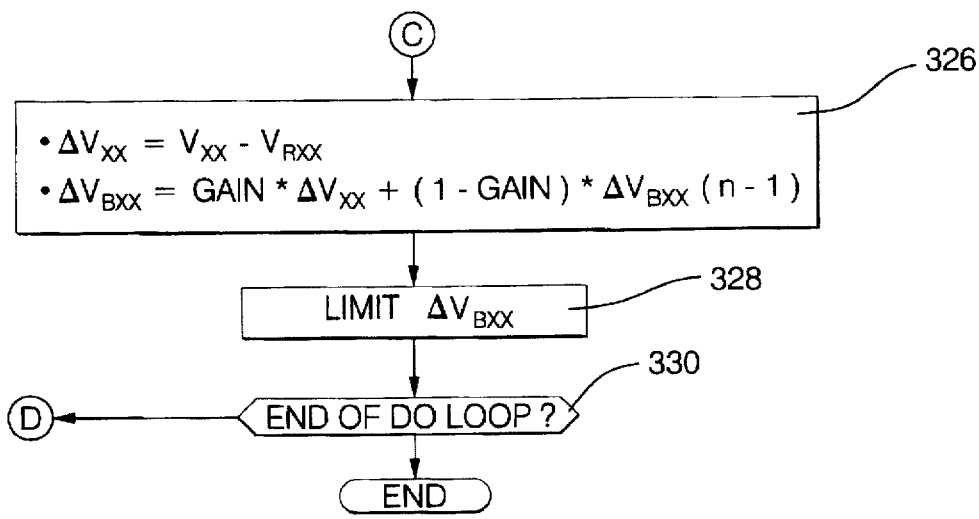
FIG. 38C illustrates further additional example flow control for block 200 of FIG. 35.

Referring now to FIGS. 38A–C, the subroutine starts and moves to block 250 where it checks the DFA flag. If the DFA flag is set to true, the routine moves to block 252. Otherwise the routine moves to block 254. At block 252, the routine designates the left front wheel as the left active wheel (LAW) and the right front wheel as the right active wheel (RAW). At block 254, the routine designates the left rear wheel as the LAW and the right rear wheel as the RAW.

The routine then moves to block 256 where it compares the command $\Delta V_{LR}$ to zero. If $\Delta V_{LR}$ is less than zero, signifying that a counterclockwise yaw moment is desired, the routine moves to block 258. If $\Delta V_{LR}$ is not less than zero, signifying that a clockwise yaw moment is desired, the routine moves to block 260. At block 258, the routine checks the ABS active flag. If the ABS active flag is set, the routine continues to block 262 where it determines that the primary wheel (PW) is the RAW and the secondary wheel (SW) is the LAW.

If the ABS active flag is not set at block 258 or if at block 260 the ABS flag is set, the routine continues to block 264 where it sets the LAW as the PW and the RAW as the SW. If at block 260 the ABS active flag is not set, the routine continues to block 266 where the primary and secondary wheels are set as done at block 262. It is noted that the primary wheel is the wheel to which brake force is to be applied to develop a differential torque if ABS is not active or where brake pressure is released if ABS is active.

The blocks 270–328 are performed for each wheel to determine whether or not the ABC wheel flag, ABC-WHEEL$_{XX}$ (where XX=LF (left front), RF (right front), LR (left rear), RR (right rear)), is to be set for that wheel and to determine the base delta velocity $\Delta V_{BXX}$ for that wheel. The ABCWHEEL$_{XX}$ flag is true for a given wheel if the ABC active flag is set and the wheel in question is the primary wheel. The ABCWHEEL$_{XX}$ flag is also true for a wheel if the ABC flag is set, if the wheel in question is the secondary wheel, if the ABS flag is not set and the TCS flag is not set. Also the ABCWHEEL$_{XX}$ flag is set to true if the ABC flag is set, the wheel in question is the secondary wheel, the ABS flag is not set, the TCS flag is set, and the DDA flag is set to false.

Moving to block 272, for each wheel the ABCWHEEL$_{XX}$ (n-1) flag (n-1 designating the "previous" flag) is set equal to the ABCWHEEL$_{XX}$ flag. Then at block 274 the routine checks the ABC active flag. If the ABC active flag is not set to true, then at block 276 the ABCWHEEL$_{XX}$ flag for that wheel is set to false. At block 278 if the wheel in question is the primary wheel the routine moves to block 280 where the ABCWHEEL$_{XX}$ flag for that wheel is set to true. At block 282, if the wheel in question is not the secondary wheel then the ABCWHEEL$_{XX}$ flag for that wheel is set to false at block 284.

From block 282 if the wheel is the secondary wheel, the routine continues to block 286 where, if the ABS active flag is set, the routine continues to block 284. Otherwise the routine continues to block 288 where it checks whether the TCS flag is set. If yes, the routine continues to block 290 where it checks the DDA flag. If the DDA flag is true, the routine continues to block 284.

If at block 288 the TCS flag is not set or if at block 290 the DDA flag is set to false, the routine continues to block 292 where the ABCWHEEL$_{XX}$ flag for that wheel is set to true.

From blocks 292, 284, 280 or 276, the routine continues to block 302 where it checks whether the master cylinder has a pressure sensor. If not the routine continues to block 314 where the SWC$_{XX}$ flag, which indicates whether or not the secondary wheel is under active brake control, is reset, indicating that the secondary wheel flag is not under active brake control. If there is a master cylinder pressure sensor, the routine continues to block 304 where it checks to determine if the wheel in question is designated as the secondary wheel. If the wheel in question is not the secondary wheel, the routine continues to block 314. Otherwise the routine continues to block 306 where it checks whether the ABS active flag is set.

If the ABS active flag is set, the routine continues to block 314. Otherwise the routine continues to block 308 where it checks the master cylinder pressure sensor output and compares the output to a threshold, for example, 150 psi. If the master cylinder pressure is above this threshold, it indicates that the driver's foot is depressing the brake pedal. If the master cylinder pressure is not above the threshold, the routine continues to block 314. Otherwise the routine continues to block 310 where it checks the DFA flag. If the DFA flag is not set to true, the routine continues to block 314. Otherwise the routine continues to block 312 where it sets the SWC$_{XX}$ flag to true.

From block 312 or 314 the routine continues to block 316 where it again checks the ABC active flag. If the ABC active flag is set, the routine continues to block 318 where it checks whether the wheel under consideration is the primary wheel. If the wheel under consideration is the primary wheel, the routine continues to block 324 where it sets the filter gain, GAIN, equal to zero. Otherwise the routine continues to block 320 where it checks the SWC$_{XX}$ flag. If the SWC$_{XX}$ flag is set to true, the routine again continues to block 324. Otherwise the routine continues to block 322 to which it continues if at block 316 the ABC active flag is not set.

At block 322, GAIN is set equal to a predetermined value, i.e., 0.03. From block 322 or block 324, the routine continues to block 326 where it computes the delta velocity for the wheel, $\Delta V_{XX}$ (where XX=LF, RF, LR, RR), according to:

$$\Delta V_{XX} = V_{XX} - V_{RXX},$$

where $V_{XX}$ is the normalized wheel speed and $V_{RXX}$ is the reference speed determined above with reference to FIG. 32. Block 326 also computes the base delta velocity for each wheel, $\Delta V_{BXX}$, according to the equation:

$$\Delta V_{BXX} = \text{GAIN} * \Delta V_{XX} + (1-\text{GAIN}) * \Delta V_{BXX}(n-1).$$

Then at block 328, $\Delta V_{BXX}$ is limited so that it is greater than the predetermined minimum, for example -6.0 kph, and less than the TCS target velocity referred to above with reference to FIG. 33. From block 328 the routine moves to block 330 where it repeats the loop beginning at block 270 until it has been executed for all four vehicle wheels, after which block 200 in FIG. 35 is completed.

When the gain of the filter block 326 is set to zero at block 324, this has the effect of freezing the value $\Delta V_{BXX}$ so that it can be used as a reference point for calculating ABC target delta velocity (described below). This is done to support the PD or PID control which determines the value $\Delta V_{LR}$. The low cut off frequency for the filter is used so that each wheel's $\Delta V_{BXX}$ does not follow the cycling of the wheel during ABS or traction control conditions. The limits imposed at blocks 328 minimize the effects of possible deep wheel cycles that can occur on low coefficient of friction surfaces that may otherwise pass through the low pass filter at block 326.

Figure 40:
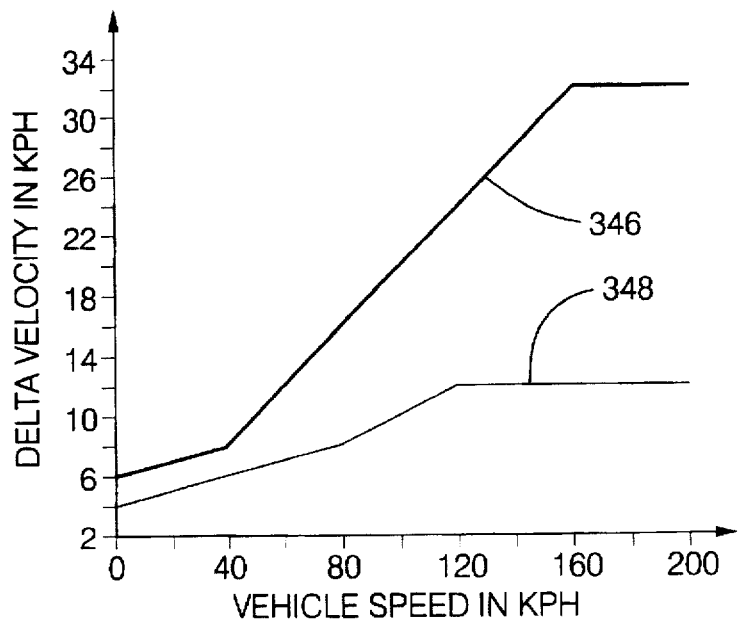
FIG. 40 illustrates an example relationship between vehicle reference speed and maximum allowed delta velocity.

Referring to FIG. 35, once the subroutine at block 200 is completed, the routine moves to block 202 where it performs a subroutine for calculating the maximum delta velocity representing the maximum change in brake force allowed at a wheel. The maximum delta velocity varies depending upon the state of the vehicle and depending on the vehicle speed. Therefore, separate vector calibration is necessary for understeer and oversteer. The input to each of the vectors is the vehicle reference speed, $V_S$, and the output is the maximum allowed delta velocity, $\Delta V_M$, in kilometers/hr. Since the relationships are nonlinear, as shown in FIG. 40, look-up tables are implemented.

Figure 39:
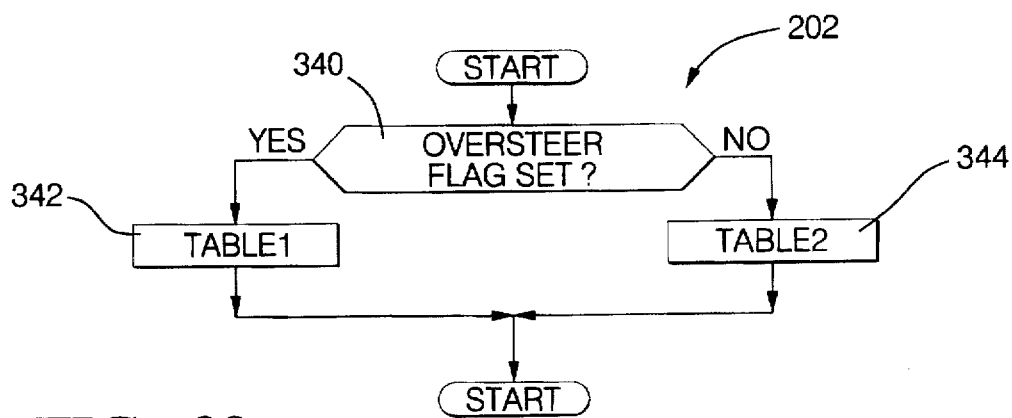
FIG. 39 illustrates an example flow control for block 202 of FIG. 35.

The routine is shown with reference to FIG. 39, which starts at block 340 where it checks the oversteer flag. If the oversteer flag is set the routine continues to block 342 where it looks up from an oversteer calibration table, i.e., trace 346 in FIG. 40, $\Delta V_M$ using vehicle speed as the input. If the oversteer flag is not set, then at block 344, $\Delta V_M$ is retrieved from a separate understeer table, i.e., trace 348 in FIG. 40.

After block 342 or 344 the subroutine 202 is completed. Referring again to FIG. 35, from block 202, the routine continues to block 204. At block 204 a subroutine is performed to calculate the target delta velocity for each wheel, $\Delta V_{TXX}$, based on the $\Delta V_{LR}$ command, the master cylinder pressure (if available), the ABS and TCS flags and $\Delta V_M$.

Figure 41A:
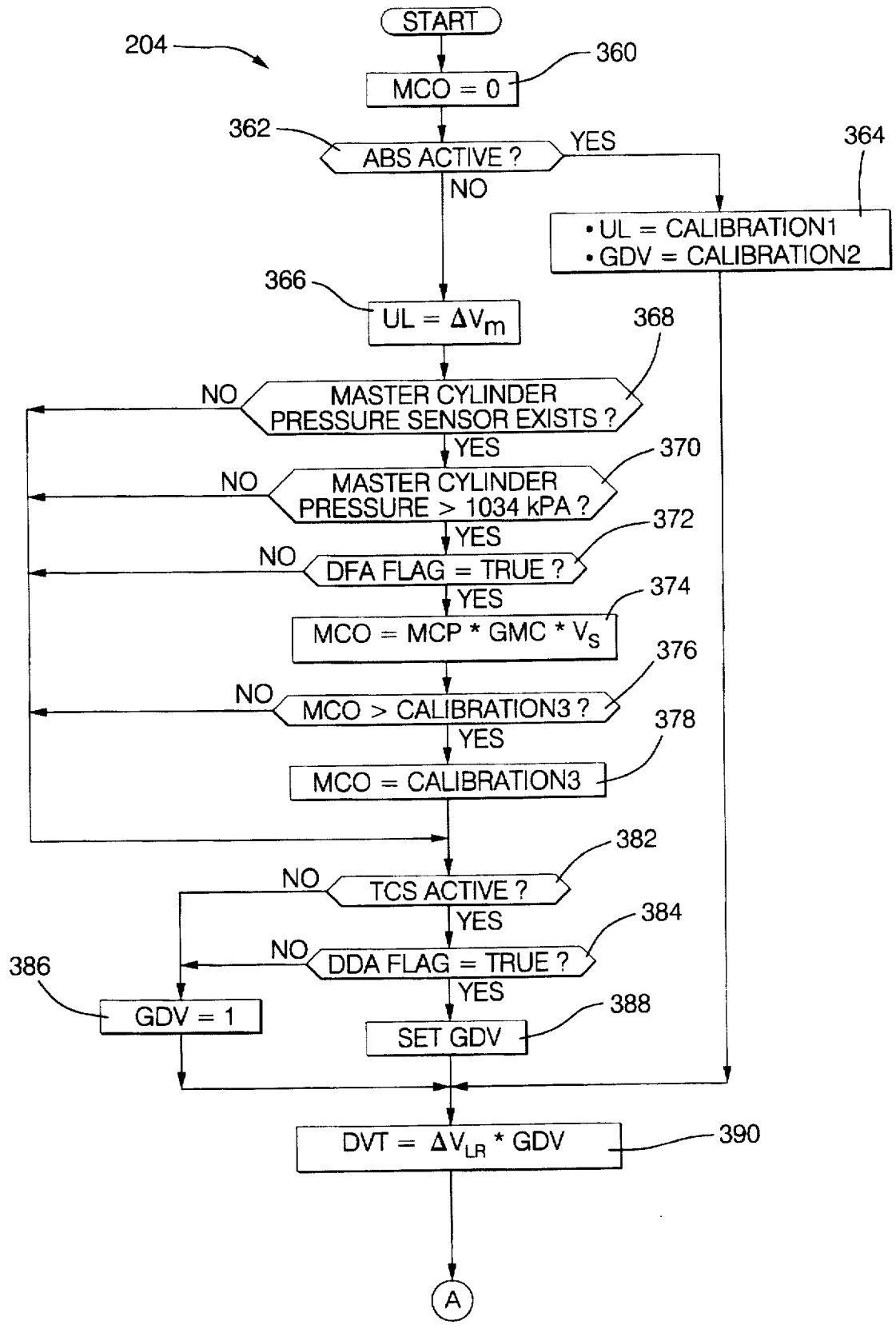
FIG. 41A illustrates an example flow control for block 204 of FIG. 35.
Figure 41B:
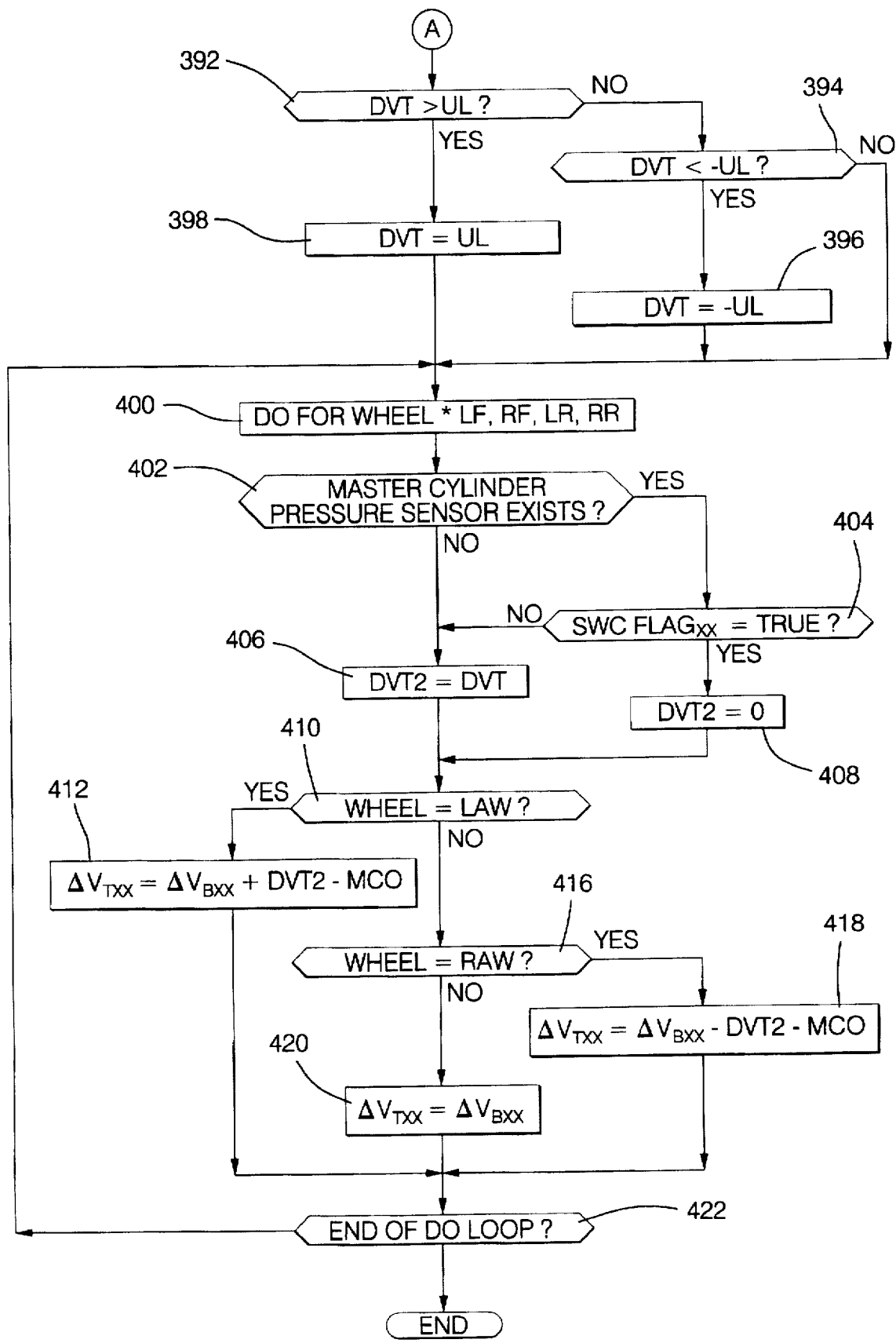
FIG. 41B illustrates additional example flow control for block 204 of FIG. 35.

Referring to FIGS. 41A-B, the subroutine for determining $\Delta V_{TXX}$ starts and moves to block 360 where it sets a variable MCO, representing an offset to be calculated, equal to zero. Then at block 362, it checks the ABS active flag. If the ABS is active then the routine limits the amount of pressure release to be commanded to adjust yaw rate. This is done by block 364 by setting the upper limit value, UL, equal to a predetermined constant, i.e., 6.0 kph. Block 364 also sets the delta velocity gain, GDV, equal to a predetermined calibrated value, i.e., 0.314. From block 364 the routine continues to block 390 described further below.

If at block 362 the ABS flag is not set, the routine continues to block 366 where it sets UL equal to $\Delta V_M$. Then at block 368 the routine is sent to block 382 if no master cylinder pressure sensor is included on the vehicle. Otherwise the routine continues to block 370 where it performs the same test performed at block 308, FIG. 38B. If the test is false, the routine continues to block 382. If the test is true, the routine continues to block 372 where it checks the DFA flag and, if the flag is set to false, continues to block 382.

If the DFA flag is set to true, the routine continues to block 374 where it determines a brake command responsive to the master cylinder pressure signal. The brake command determined at block 374 is used in a brake-by-wire control of the front wheels for systems in which the activation of the actuators would otherwise isolate the front brakes from the driver pedal. The brake-by-wire control bypasses that isolation to maintain continuous brake feel to the driver. Block 374 calculates the master cylinder offset value, MCO, according to:

$$MCO = MCP * GMC * V_S,$$

where MCP is the measured master cylinder pressure and GMC is the master cylinder gain, for example, 0.0000765.

Next blocks 376 and 378 limit MCO to a predetermined maximum offset, for example 20 kph. Then at block 382, the routine checks whether or not the TCS flag is set. If not, the routine continues to block 386 where it sets the delta velocity gain GDV equal to 1. If the TCS flag is set, the routine continues to block 384 where it checks whether the DDA flag is set to true. If not, the routine continues to block 386. If so, the routine continues to block 388 where GDV is set to 0.5.

From block 386 or 388, the routine continues to block 390 where the temporary delta velocity value, DVT, is determined according to:

$$DVT = \Delta V_{LR} * GDV.$$

At block 392 DVT is compared to UL. If DVT is greater than UL, the routine continues to block 398 where DVT is limited to UL. If at block 392 DVT is not greater than UL, the routine continues to block 394 where it compares the value DVT temp to minus one times UL. If DVT is less than the result, then block 396 limits DVT to minus one times UL.

From block 398, 394 or 396, the routine continues to block 400 where it begins a loop run for each of the four wheels. At block 402, the routine checks whether or not a master cylinder pressure sensor is included on the vehicle. If not, the routine continues to block 406 where it determines a second temporary value, DVT2, equal to DVT. If the vehicle includes a master cylinder pressure sensor, the routine continues to block 404 where it checks whether the SWC$_{XX}$ flag is set to true. If not, the routine continues to block 406. If yes, the routine continues to block 408 where it sets DVT2 equal to zero.

From block 406 or 408, the routine continues to block 410 where it checks whether the wheel being considered is the LAW. If so, the routine continues to block 412 where it computes the ABC target delta velocity for that wheel, $\Delta V_{TXX}$, according to:

$$\Delta V_{TXX} = \Delta V_{BXX} + DVT2 - MCO.$$

From block 412, the routine continues to block 422, which sends the routine to repeat the do loop until all four wheels have been considered.

If at block 410 the wheel is not the LAW, the routine continues to block 416 where it checks whether or not the wheel is the RAW. If yes, block 418 sets the ABC target delta velocity according to:

$$\Delta V_{TXX} = \Delta V_{BXX} - DVT2 - MCO.$$

From block 418 the routine moves to block 422. If, at block 416, the wheel is not the right active wheel, the routine continues to block 420 where the ABC target delta velocity for that wheel is set equal to the ABC base delta velocity for that wheel. Then the routine continues to block 422 and once all four wheels have been considered by the loops from blocks 400 to 422, the routine is exited.

Thus, the routine at block 204 determines the ABC target delta velocity for each of the four wheels responsive to the ABC base delta velocity, a gain term determined at block 386 or 388 multiplied by the $\Delta V_{LR}$ command. Additionally, if a master cylinder pressure sensor is implemented, the ABC target delta velocity is responsive to the master cylinder pressure.

The master cylinder pressure sensor is necessary in rear wheel drive implementation since during active brake control, the master cylinder may be completely isolated from both front and rear wheels. This allows the common offset to be added to both wheel terms based on the vehicle operator input to the master brake cylinder.

In systems in which the base brakes are a drive-by wire implementation, the master cylinder pressure sensor will generally be included in the vehicle. The portion of the term represented by $\Delta V_{LR}$ is limited when the ABS is active and when the differential torque by the active brake control is being applied to the driven axle while the traction control is active. This is the purpose of the constant gain at block 388. This helps in providing transitions between active brake control and traction control modes. The limit during ABS and traction control compensates for increased differential torque authority resulting from the cycling of the brakes during traction control and in ABS events.

Referring again to FIG. 35, once the subroutine at block 204 is completed and the target delta velocity is calculated for each vehicle wheel, the routine continues to blocks 206 to 210 where a loop is repeated performing the subroutine at block 208 for each of the four vehicle wheels. The subroutine at block 208 calculates the control terms for each vehicle wheel. In general, a delta velocity error for each wheel is calculated and its derivative determined. The delta velocity error is the difference between the target delta velocity and the wheel's actual delta velocity, $\Delta V_{XX}$.

Figure 42:
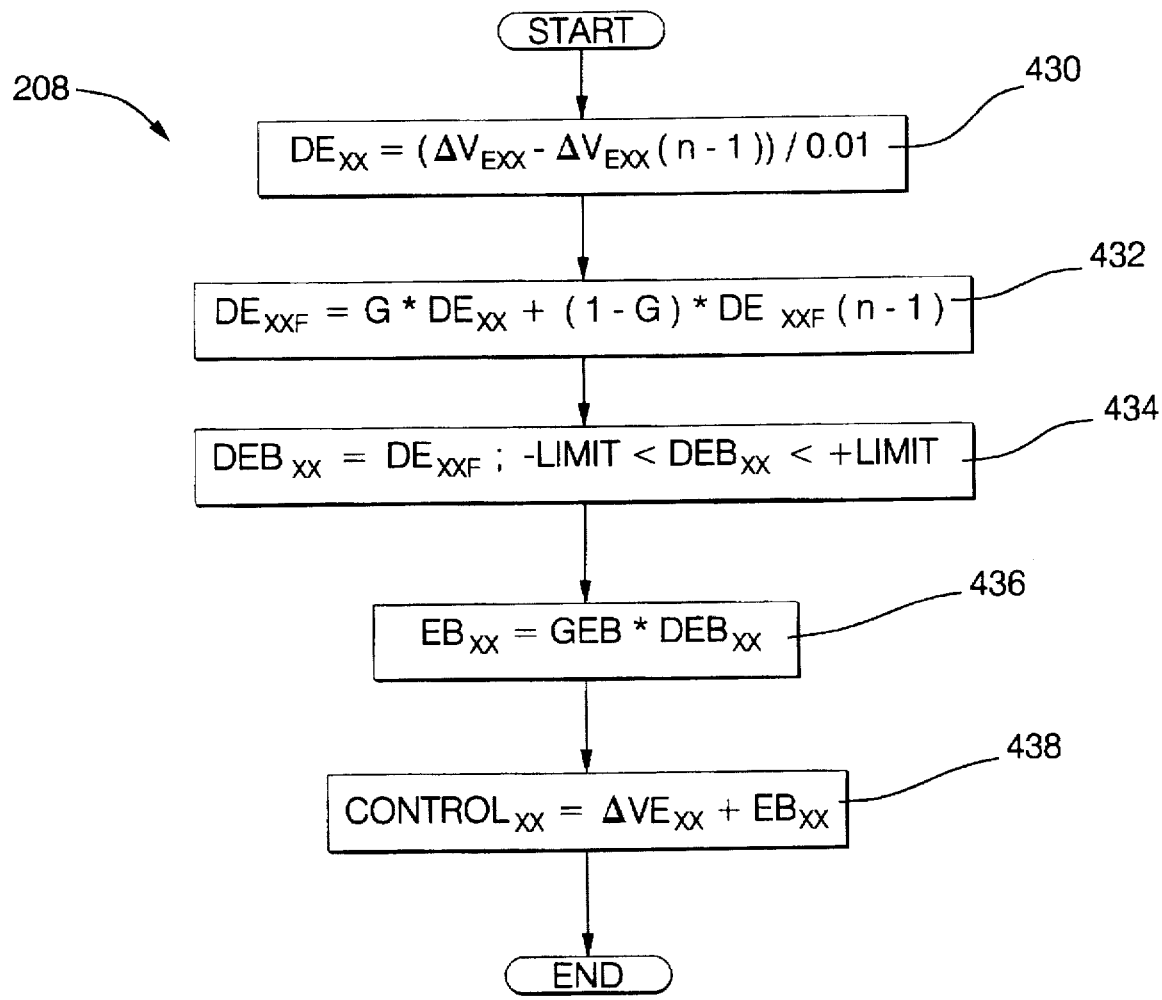
FIG. 42 illustrates example flow control for block 208 of FIG. 42.

More particularly, referring to FIG. 42, the routine first updates the delta velocity error, $\Delta V_{EXX}$ equal to $\Delta V_{XX}$ minus $\Delta V_{TXX}$. Then a derivative of the error term, DE$_{XX}$, is determined as $(\Delta V_{EXX} - \Delta V_{EXX}(n-1))/0.01$.

From block 430, the routine continues to block 432 where it filters DE$_{XX}$ to determine DE$_{XXF}$ according to the equation:

$$DE_{XXF} = 0.25 * DE_{XX} + 0.75 * DE_{XXF}(n-1).$$

Block 434 next determines a term DEB$_{XX}$ equal to DE$_{XXF}$, but no greater than an upper limit and no lower than a lower limit. The upper and lower limits are, for example, +/−70.6 kph/s.

Block 436 next determines an error bias term, EB$_{XX}$ equal to DEB$_{XX}$ multiplied by a predetermined gain, GEB, for example, 0.086.

Then at block 438, the control term for the wheel, CONTROL$_{XX}$, is determined as the sum of $\Delta VE_{XX}$ plus EB$_{XX}$.

The control terms, CONTROL$_{XX}$, control the brake fluid apply and release rate for the wheels under control. A positive control term (above a deadband) commands an apply of brake fluid to the wheel brake, a negative control term (below the deadband) commands a release of brake fluid from the wheel brake and a control term within the deadband maintains the brake pressure at its current level. Application of the control terms to affect the desired apply and release rates is well known to those skilled in the art of anti-lock brake control and/or positive acceleration traction control.

We claim:

1. In a vehicle with first and second front vehicle wheels and third and fourth rear vehicle wheels, a brake control method comprising the steps of:

determining a desired vehicle yaw rate;

determining an actual vehicle yaw rate;

determining a vehicle speed;

responsive to the vehicle speed and a first nonlinear control function, determining a proportional gain, wherein the proportional gain varies nonlinearly with vehicle speed;

responsive to the vehicle speed and a second nonlinear control function, determining a derivative gain, wherein the derivative gain varies nonlinearly with vehicle speed;

responsive to the proportional gain, the derivative gain and the desired and actual vehicle yaw rates, determining a torque command;

applying the torque command to at least one of the vehicle wheels to create a yaw torque moment on the vehicle with respect to a road surface, wherein a difference between the desired vehicle yaw rate and the actual vehicle yaw rate is minimized and wherein a control response provided by the torque command varies nonlinearly with vehicle speed to match vehicle speed-related dynamics.

2. A brake control method according to claim 1, wherein the vehicle includes at least one member of a first group comprising antilock brake control and positive acceleration traction control, also comprising the steps of:

determining an axle command responsive to the desired and actual vehicle yaw rates; and applying the axle command during activation of one of the antilock brake control and the positive acceleration traction control to one member of a second group comprising (i) the two front wheels and (ii) the two rear wheels, wherein wheel-to-road traction is increased and a difference between desired vehicle yaw rate and actual vehicle yaw rate is minimized.

3. A brake control method according to claim 1, also comprising the steps of:

determining a proportional term responsive to the proportional gain and the desired and actual vehicle yaw rates;

determining a derivative term responsive to the derivative gain and the desired and actual vehicle yaw rates;

determining an integral term responsive to an integral gain and the desired and actual vehicle yaw rates, wherein the integral term is minimized during dynamic vehicle maneuvers and accumulated during steady-state vehicle maneuvers, wherein the torque command is responsive to the proportional, derivative and integral terms, wherein the torque command corrects for steady-state error and has a quick response in dynamic maneuvers.

4. A brake control method according to claim 3, also comprising the step of resetting the integral term to zero whenever a change in direction of steer occurs.

5. In a vehicle with first and second front vehicle wheels and third and fourth rear vehicle wheels and at least one member of a first group comprising anti-lock brake control and positive acceleration traction control, a brake control method comprising the steps of:

determining a desired vehicle yaw rate;

determining an actual vehicle yaw rate;

responsive to the desired and actual vehicle yaw rates, determining an axle command;

responsive to the desired and actual vehicle yaw rates, determining a torque command;

applying the axle command during activation of one of the anti-lock brake control and the positive acceleration traction control to one member of a second group comprising (i) the two front wheels and (ii) the two rear wheels, wherein wheel-to-road traction is increased and a difference between desired vehicle yaw rate and actual vehicle yaw rate is minimized; and applying the torque command to at least one of the vehicle wheels independently of the axle command to create a yaw torque moment on the vehicle body with respect to the road surface, wherein the difference between the desired vehicle yaw rate and the actual vehicle yaw rate is minimized.

6. A brake control method according to claim 5, wherein the torque command is also responsive to a proportional and a derivative gain, wherein the proportional and derivative gains vary in relation to vehicle speed.

7. A brake control method according to claim 6, wherein the relation between the proportional gain and vehicle speed is nonlinear.

8. A brake control method according to claim 6, wherein the relation between the derivative gain and vehicle speed is nonlinear.

9. A brake control method according to claim 5, wherein the axle command is also responsive to a proportional and a derivative gain, wherein the derivative gain varies in relation to the difference between the desired vehicle yaw rate and the actual vehicle yaw rate.

10. A brake control method according to claim 9, wherein the derivative gain varies depending upon whether the difference between the desired vehicle yaw rate and the actual vehicle yaw rate is converging or diverging.

11. A brake control method according to claim 5, also comprising the steps of:

determining a yaw rate error responsive to the difference between the desired vehicle yaw rate and the actual vehicle yaw rate, wherein the axle command and the torque command are determined in response to the yaw rate error; and in response to an indication of an exit condition, progressively reducing the yaw rate error to zero, wherein the yaw rate error decays to zero and the axle and torque commands decay to zero, providing a smooth transition from active brake control during exit conditions.

* * * * *